United States Patent [19]

Penner et al.

[11] Patent Number: 5,272,002
[45] Date of Patent: Dec. 21, 1993

[54] TRANSPARENT OPTICAL ARTICLE EXHIBITING HIGH SECOND ORDER POLARIZATION SUSCEPTIBILITY AND LOW TRANSMISSION ATTENUATION

[75] Inventors: Thomas L. Penner, Fairport; Douglas R. Robello, Webster; Nancy J. Armstrong, Ontario; David J. Williams, Fairport; Matthew C. Ezenyilimba, Rochester, all of N.Y.

[73] Assignee: Eastman Kodak Company, Rochester, N.Y.

[21] Appl. No.: 913,569

[22] Filed: Jul. 14, 1992

Related U.S. Application Data

[63] Continuation-in-part of Ser. No. 735,551, Jul. 25, 1991, abandoned.

[51] Int. Cl.$^5$ .................. C08F 220/34; B05D 1/20
[52] U.S. Cl. .................. 428/333; 428/411.1; 359/483; 427/164; 427/402; 526/312; 526/277
[58] Field of Search .................. 428/333, 411.1; 359/483; 427/164, 402; 526/312, 277

[56] References Cited

U.S. PATENT DOCUMENTS

| | | | |
|---|---|---|---|
| 4,431,263 | 2/1984 | Garito | 350/96.34 |
| 4,515,429 | 5/1985 | Smith et al. | 350/96.13 |
| 4,792,208 | 12/1988 | Ulman et al. | 350/96.34 |

FOREIGN PATENT DOCUMENTS

| | | |
|---|---|---|
| 0313474 | 4/1989 | European Pat. Off. |
| 0415278 | 3/1991 | European Pat. Off. |
| 9015087 | 12/1990 | PCT Int'l Appl. |

OTHER PUBLICATIONS

D. J. Williams, "Organic Polymeric and Non-Polymeric Materials with Llarge Optical Nonlinearities", *Angew. Chem. Int. Ed. Engl.* 23 (1984) 690–703.

Zyss, "Nonlinear Organic Materials for Integrated Optics", *Journal of Molecular Electronics*, vol. 1, pp. 25–45, 1985.

Girling, Cade, Kolinsky, and Montgomery, "Observation of Second Harmonic Generation from a Langmuir–Blodgett Monolayer of a Merocyanine Dye", *Electronics Letters*, vol. 21, No. 5, May 28, 1985.

Neal, Petty, Roberts, Ahmad, and Feast, "Second Harmonic Generation from LB Superlattices Containing two Active Components", *Electronics LEtters*, vol. 22, No. 9, Apr. 24, 1986.

*Electronic and Photonic Applications of Polymers*, M. J. Bowden and S. R. Turner Ed., Chapter 6, Polymers in Nonlinear Optics, by D. Williams, American Chemical Society 1988.

*Primary Examiner*—P. C. Sluby
*Attorney, Agent, or Firm*—Robert Luke Walker

[57] ABSTRACT

An optical article is disclosed comprised of an organic layer unit exhibiting a second order polarization susceptibility greater than $10^{-9}$ esu and means for providing an optical input to and an optical output from the layer unit. The organic layer unit exhibits a transmission attenuation of less than 2 dB/cm and is comprised of a Y type Langmuir-Blodgett assembly having superimposed oriented monomolecular layers of first and second polymeric amphiphiles each containing repeating units comprised of a hydrophilic moiety and a lipophilic moiety. Repeating units of one or both of the first and second amphiphiles each contain an organic molecular dipole, and repeating units of one or both of the first and second amphiphiles each contains a branched lipophilic moiety of up to 9 carbon atoms.

17 Claims, 4 Drawing Sheets

TRANSPARENT OPTICAL ARTICLE EXHIBITING HIGH SECOND ORDER POLARIZATION SUSCEPTIBILITY AND LOW TRANSMISSION ATTENUATION

This application is a continuation-in-part of commonly-assigned U.S. patent application Ser. No. 07/735,551 entitled OPTICAL ARTICLE EXHIBITING HIGH SECOND ORDER POLARIZATION SUSCEPTIBILITY AND LOW TRANSMISSION ATTENUATION, filed Jul. 25, 1991, by T. L. Penner, D. R. Robello, N. J. Armstrong, and D. J. Williams now abandoned.

FIELD OF THE INVENTION

The invention is directed to optical articles exhibiting high second order polarization susceptibilities.

BACKGROUND OF THE INVENTION

The significant polarization components of a medium produced by contact with an electric field are first order polarization (linear polarization), second order polarization (first nonlinear polarization), and third order polarization (second nonlinear polarization). On a molecular level this can be expressed by Equation 1:

$$P = \alpha E + \beta E^2 + \gamma E^3 \ldots \quad (1)$$

where
P is the total induced polarization,
E is the local electric field created by electromagnetic radiation, and
$\alpha$, $\beta$, and $\gamma$ are the first, second, and third order polarizabilities, each of which is a function of molecular properties.
$\beta$ and $\gamma$ are also referred to as first and second hyperpolarizabilities, respectively. The molecular level terms of Equation 1 are first order or linear polarization $\alpha E$, second order or first nonlinear polarization $\beta E^2$, and third order or second nonlinear polarization $\gamma E^3$.

On a macromolecular level corresponding relationships can be expressed by Equation 2:

$$P = \chi^{(1)} E + \chi^{(2)} E^2 + \chi^{(3)} E^3 \ldots \quad (2)$$

where
P is the total induced polarization,
E is the local electric field created by electromagnetic radiation, and
$\chi^{(1)}$, $\chi^{(2)}$, and $\chi^{(3)}$ are the first, second, and third order polarization susceptibilities of the electromagnetic wave transmission medium. $\chi^{(2)}$ and $\chi^{(3)}$ are also referred to as the first and second nonlinear polarization susceptibilities, respectively, of the transmission medium. The macromolecular level terms of Equation 2 are first order or linear polarization $\chi^{(1)}E$, second order or first nonlinear polarization $\chi^{(2)}E^2$, and third order or second nonlinear polarization $\chi^{(3)}E^3$.

To achieve on a macromolecular level second order polarization, $\chi^{(2)}E^2$, of any significant magnitude, it is essential that the transmission medium exhibit second order (first nonlinear) polarization susceptibilities, $\chi^{(2)}$, greater than $10^{-9}$ electrostatic units (esu). To realize such values of $\chi^{(2)}$ it is necessary that the first hyperpolarizability $\beta$ be greater than $10^{-30}$ esu.

A significant difficulty encountered in finding materials exhibiting usefully large second order polarization effects lies in the molecular requirements that must be satisfied to achieve usefully large values of $\beta$. For a molecule to exhibit values of $\beta$ greater than zero, it is necessary that the molecule be asymmetrical about its center—that is, noncentrosymmetric. Further, the molecule must be capable of oscillating (i.e., resonating) between an excited state and a ground state differing in polarity. It has been observed experimentally and explained by theory that large $\beta$ values are the result of large differences between ground and excited state dipole moments as well as large oscillator strengths (i.e., large charge transfer resonance efficiencies). Materials having usefully large values of $\beta$ are commonly referred to as molecular dipoles.

For $\chi^{(2)}$ to exhibit a usefully large value it is not only necessary that $\beta$ be large, but, in addition, the molecular dipoles must be aligned so as to lack inversion symmetry. The largest values of $\chi^{(2)}$ are realized when the molecular dipoles are arranged in polar alignment—e.g., the alignment obtained when molecular dipoles are placed in an electric field.

For a number of years the materials employed for achieving second order polarization effects were non-centrosymmetric inorganic crystals, such as potassium dihydrogen phosphate and lithium niobate. D. J. Williams, "Organic Polymeric and Non-Polymeric Materials with Large Optical Nonlinearities", *Angew. Chem. Int. Ed. Engl.* 23 (1984) 690-703, postulated mathematically and experimentally corroborated second order polarizabilities in organic molecular dipoles equalling and exceeding those of inorganic crystals. Electrical poling and Langmuir-Blodgett construction techniques were recognized from the outset to be feasible approaches for polar alignment of the organic molecular dipoles to translate molecular second order polarizabilities into layer second order polarization susceptibilities. Zyss, "Nonlinear Organic Materials for Integrated Optics", *Journal of Molecular Electronics*, Vol. 1, pp. 25-45, 1985, is essentially cumulative with Williams, surveying applications for organic molecular dipoles to varied nonlinear optical needs.

Garito U.S. Pat. No. 4,431,263; Girling, Cade, Kolinsky, and Montgomery, "Observation of Second Harmonic Generation from a Langmuir-Blodgett Monolayer of a Merocyanine Dye," *Electronics Letters*, Vol. 21, No. 5, 2/28/85; Neal, Petty, Roberts, Ahmad, and Feast, "Second Harmonic Generation from LB Superlattices Containing two Active Components," *Electronics Letters*, Vol. 22, No. 9, 4/24/86; and Ulman et al U.S. Pat. No. 4,792,208 provide illustrations of organic molecular dipoles deposited by Langmuir-Blodgett techniques to form layers exhibiting significant $\chi^{(2)}$ values.

Williams and Zyss are extrapolations from limited demonstrated capabilities to theoretically possible applications. Garito, Girling et al, Neal et al, and Ulman are concerned with Langmuir-Blodgett components to meet device requirements. *Electronic and Photonic Applications of Polymers*, M. J. Bowden and S. R. Turner Ed., Chapter 6, Polymers in Nonlinear Optics, by D. Williams, American Chemical Society 1988, suggests that polymeric Langmuir-Blodgett films have the theoretical capability of producing useful devices.

What has been accomplished by those skilled in the art is to ascertain that of varied routes available for constructing optical articles exhibiting high second order polarization susceptibilities the use of organic layer units constructed by Langmuir-Blodgett techniques is a theoretically feasible possibility.

What the art has failed to accomplish is the construction by Langmuir-Blodgett techniques of high second order polarization susceptibility optical articles exhibiting sufficiently high levels of stability and low levels of internal optical attenuation to achieve sought after device performance levels.

Penner et al U.S. Ser. No. 07/760,436, concurrently filed and commonly assigned, titled IMPROVED CONVERSION EFFICIENCY SECOND HARMONIC GENERATOR, discloses an optical article comprised of a support including a portion adjacent one major surface which is transparent to the electromagnetic radiation sought to be propagated, an organic layer unit capable of converting a portion of polarized electromagnetic radiation of a selected wavelength to its second harmonic wavelength, means for optically coupling into said organic layer unit polarized electromagnetic radiation of a selected wavelength in its zero order transverse magnetic mode, and means for receiving from the layer unit a portion of the electromagnetic radiation in the form of a first order transverse magnetic mode. The organic layer unit has a thickness which is at least 70 percent of the wavelength of the zero order transverse magnetic mode and differs by less than 100 Å from the thickness required for identical propagation constants of the zero and first order transverse magnetic modes. The organic layer unit is comprised of a Y-type Langmuir-Blodgett assembly of amphiphiles forming a first Langmuir-Blodgett layer unit containing noncentro-symmetric organic molecular dipoles of a first orientation providing a second order polarization susceptibility to the first layer unit in excess of $10^{-9}$ electrostatic units, and a Y-type Langmuir-Blodgett assembly of amphiphiles forming a second Langmuir-Blodgett layer unit adapted to be coated on the first Langmuir-Blodgett layer unit containing noncentro-symmetric organic molecular dipoles of a second orientation providing a second order polarization susceptibility to the second layer unit in excess of $10^{-9}$ electrostatic units, but of opposite sign to that of the first layer unit.

SUMMARY OF THE INVENTION

In one aspect, this invention is directed to an optical article comprised of an organic layer unit exhibiting a second order polarization susceptibility greater than $10^{-9}$ esu and means for providing an optical input to and an optical output from the layer unit.

The invention is characterized in that the organic layer unit exhibits a transmission attenuation of less than 2 dB/cm for electromagnetic radiation, in a particular embodiment, at wavelength between 400 and 500 nanometers. The invention comprised of a Y type Langmuir-Blodgett assembly having superimposed oriented monomolecular layers of first polymeric amphiphiles each containing repeating units comprised of a hydrophilic moiety and a lipophilic moiety and, interposed between each adjacent pair of oriented monomolecular layers of said first polymeric amphiphiles, an oriented monomolecular layer of second polymeric amphiphiles each containing repeating units comprised of a hydrophilic moiety oriented adjacent a hydrophilic moiety of a first amphiphile of one adjacent monomolecular layer and a lipophilic moiety oriented adjacent a lipophilic moiety of a first amphiphile of a second adjacent monomolecular layer. Repeating units of at least one of the first and second amphiphiles each contain an organic molecular dipole, and repeating units of at least one of the first and second amphiphiles each contain a branched lipophilic moiety of up to 9 carbon atoms.

It is an advantageous effect of some of the embodiments of this invention to provide optical articles comprised of organic layer units exhibiting high second order polarization susceptibilities as well as acceptable levels of stability and low levels of internal optical attentuation of light having a wavelength between 400 and 500 nanometers.

Figure 1:
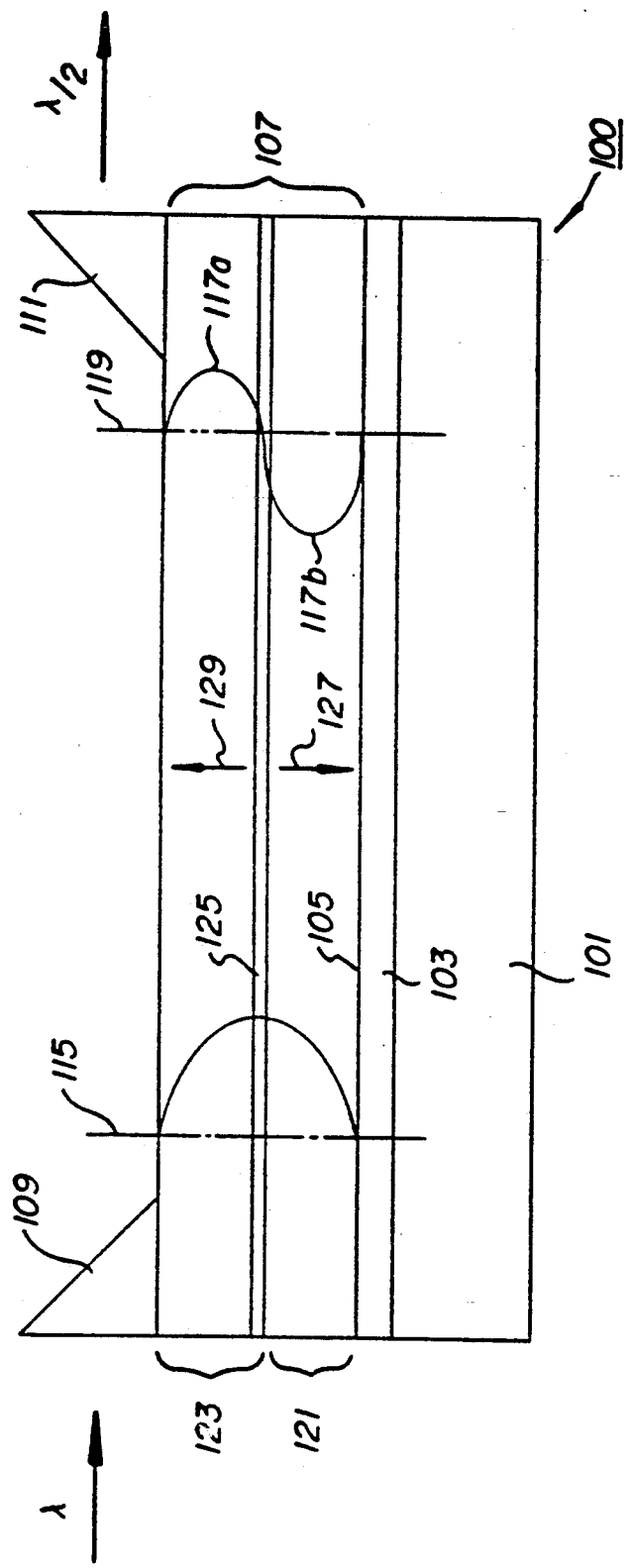
FIG. 1 is a schematic diagram of an optical article satisfying the requirements of the invention.

Layer thicknesses have been exaggerated for ease of illustration.

DESCRIPTION OF SPECIFIC EMBODIMENTS

In keeping with common usage Langmuir-Blodgett layers are also referred to as L-B layers.

The invention is generally applicable to all types of optical articles containing an organic layer unit exhibiting a second order polarization susceptibility greater than $10^{-9}$ electrostatic units. The features that set all of the optical articles of the invention apart from those previously known are that the organic layer unit exhibits a transmission attentuation of less than 2 dB/cm and is constructed of a polymeric Y type Langmuir-Blodgett assembly.

Polymeric Y type L-B assemblies have been chosen for construction of the organic layer unit, since they have a variety of advantages. First, L-B assemblies can be constructed with second order polarization susceptibilities of at least $10^{-9}$ esu and well in excess of the highest levels that have been achieved by poling techniques of forming high second order polarization susceptibility organic layers. Second, L-B assemblies in general offer the advantages of precise control of layer thicknesses and uniformity. Because L-B film assemblies are constructed in mono-molecular layer increments and each mono-molecular layer typically ranges from about 10 to 50 Å, it is apparent that this approach is consistent with forming the organic layer unit within ±100 Å of an aim thickness. Third, Y type L-B assemblies are inherently more stable than X or Z type L-B assemblies, for reasons explained below. Fourth, using polymeric materials to construct the Y type L-B assemblies greatly enhances their stability. Fifth, by specific selections of lipophilic moieties forming the polymeric Y type L-B assemblies it has been possible to reduce internal optical attenuation to very low levels, below 2 dB/cm. This latter accomplishment has never previously been reported in an organic layer exhibiting higher second order polarization susceptibility.

The polymers used to construct L-B films contain repeating units that are amphiphiles—that is, repeating units that contain at least one hydrophilic moiety (H), also commonly referred to as a head group, and at least one lipophilic moiety (L), also commonly referred to as a tail group, joined through a linking group (K). The first mono-molecular polymer layer deposited on a support surface can take one of two possible orientations, depending upon whether the support surface is hydrophilic or lipophilic:

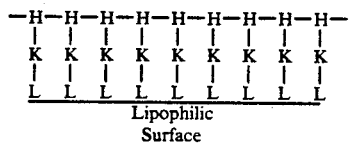

(1a)

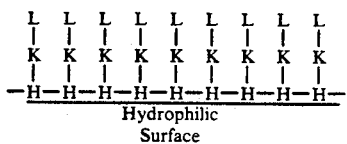

(1b)

were H—K—L in each occurrence represents one repeating unit of the polymer. The repeating units are shown linked through the hydrophilic moieties H, but the repeating units can alternatively be in many instances be linked through the lipophilic moieties L or the linking moieties K.

To achieve high second order polarizabilities, $\chi^{(2)} > 10^{-9}$ esu, it is necessary that a high proportion of the amphiphile repeating units of the polymeric layers used to construct the L-B assemblies contain a molecular dipole linking group (M). For a linking group to be considered a molecular dipole linking group its second order polarizability, $\beta$, must be greater than $10^{-30}$ electrostatic units (esu). The following reflects the inclusion of a molecular dipole:

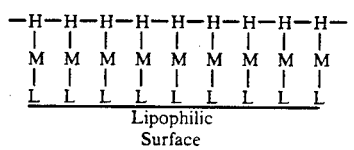

(2a)

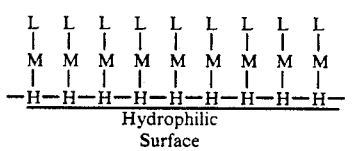

(2b)

Each molecular dipole in turn is comprised of at least one electron donor (D), at least one electron acceptor (A) and a linking group (E), specifically a conjugated $\pi$ bonding system, which provides a pathway for charge transfer resonance between A and D:

Taking into account the orientation of the molecular dipole M in the amphiphile repeating units, relationships 2a and 2b can be expanded into four relationships:

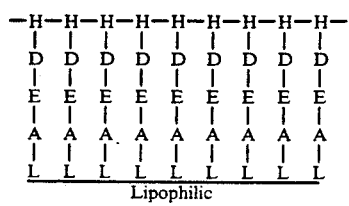

(4a)

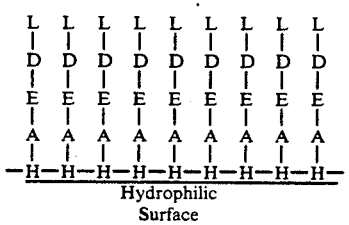

(4b)

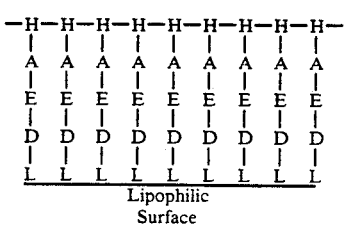

(4c)

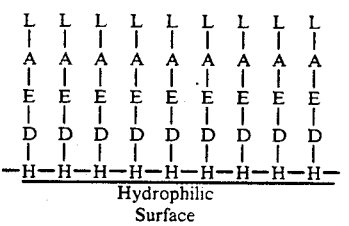

(4d)

In the foregoing description only a single amphiphile repeating unit containing polymer layer is shown on a support. To satisfy the organic layer unit thicknesses generally preferred for the optical articles of the invention a large number of superimposed amphiphile repeating unit polymer monolayers are required. Multilayer L-B assemblies are characterized as X, Y or Z type assemblies, depending on the relative orientations of the amphiphile layers. In a Z type assembly the first amphiphile layer is oriented with the hydrophilic moiety nearest the support as shown at 1b, 2b, 4b, and 4d above. The next and all subsequent amphiphile layers are deposited in the same orientation as the first amphiphile layer—that is, the hydrophilic moieties H are nearer the support than the lipophilic moieties L in each successive layer.

X type assemblies are similar to Z type assemblies, except that the lipophilic moieties L in each amphiphile layer are nearest the support. Thus, X type assemblies are constructed starting with the initial layer arrangements shown at 1a, 2a, 4a, and 4c above. The next and all subsequent amphiphile layers are deposited in the same amphiphile orientation as the first amphiphile layer—that is, the lipophilic moieties L are nearer the support than the hydrophilic moieties H in each successive layer.

X and Z type assemblies have the appeal of structural simplicity and were the only type L-B assemblies envisioned by D. Williams, cited above, to have any applicability to the construction of nonlinear optical articles, since all successive amphiphile monomolecular layers can be identical within an L-B layer unit.

It is the discovery of this invention that structurally more complex Y type L-B assemblies are not only feasible in the construction of the L-B layer units, but also produce advantages in construction and stability. In Y type L-B assemblies hydrophilic moieties are deposited on hydrophilic moieties and lipophilic moieties are deposited on lipophilic moieties:

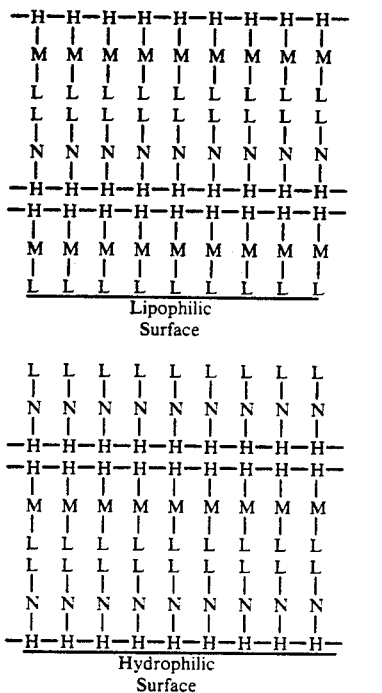

One major advantage of Y type L-B assemblies is that they place the lipophilic moieties and hydrophilic moieties in adjacent positions in the layer sequence. This avoids placing mutually repellant hydrophilic and lipophilic moieties in proximity and thereby provides a more stable L-B assembly.

However, noncentrosymmetric Y type L-B assemblies require at least two different types of amphiphile repeating unit containing polymers. In one particular form, two different polymers, containing L—M—H and L—N—H amphiphile repeating units, are required, where N represents a molecular dipole having its polarity reversed as compared with the molecular dipole M. In other words, if the molecular dipole M is oriented with its electron donor group adjacent the lipophilic moiety L, the molecular dipole N is oriented with its electron acceptor group adjacent the lipophilic moiety L, so that L—M—H is by expanded notation L—D—E—A—H while L—N—H is by expanded notation L—A—E—D—H. If the same amphiphile repeating unit were employed in each successive layer, a centrosymmetric structure would result in which the contribution of the molecular dipoles in each amphiphile layer to $\chi^{(2)}$ would be cancelled by the oppositely oriented molecular dipoles in the next adjacent layer.

An alternate Y type assembly, one that permits the use of only a single type of molecular dipole containing polymer, can be achieved by replacing every other amphiphile repeating unit polymer monomolecular layer with an amphiphile polymer monomolecular spacer layer lacking a molecular dipole. The spacer amphiphile polymers can be identical to the amphiphile polymers containing molecular dipoles, except that the molecular dipole M or N is replaced by linking group (S) which exhibits a second order polarizability of less than $10^{-30}$ esu. In this arrangement the following layer sequences can be employed:

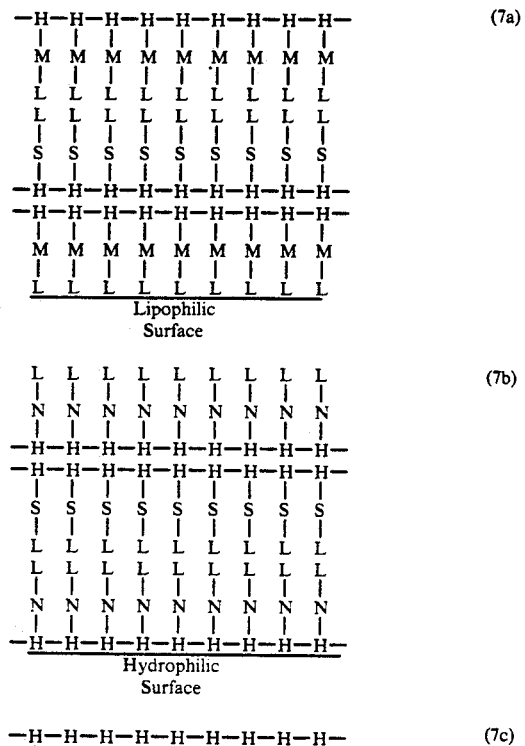

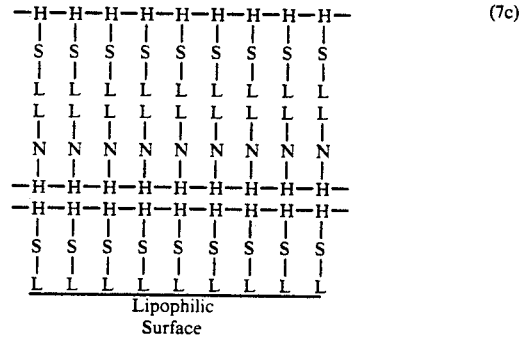

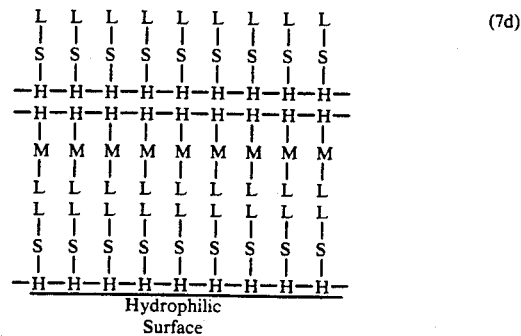

In 6a and 6b each of the amphiphile repeating units L—M—H and L—N—H must be capable of depositing on the other. This involves preparing an amphiphile polymer that, in addition to exhibiting the high second order polarizability $\beta$ desired, also performs well as an L—B amphiphile in forming successive monomolecular layers. It is apparent that this requires amphiphile selection to be based on an acceptable balance of the ability of the amphiphile to perform two entirely different functions. It has been observed that amphiphiles having high $\beta$ values can perform entirely satisfactorily as deposition surfaces for other amphiphiles or when deposited on other amphiphiles, but lack the adherency required for deposition on themselves or similar amphiphiles. By having freedom to select amphiphile repeating units L—S—H in 7a-d lacking high $\beta$ values from a wide range of known amphiphiles strictly on the basis of their desirability in terms of L-B layer construction capabilities, the advantage can be realized of achieving higher deposition efficiencies and hence more uniform and stable L-B assemblies. Since spacer moiety S of the L—S—H amphiphile repeating units can be relatively small in relation to the molecular dipoles M and N in the L—M—H and L—N—H amphiphile repeating units, any reduction in the value of $\chi^{(2)}$ attributable to the presence of spacer amphiphiles can be kept to a relatively low level.

In the foregoing discussion three successive amphiphile monolayer repeating units have been shown, which is the minimum number required to show the layer sequence. In practice many more successive layers are usually preferred to complete each of the L-B layer units. For convenience only a few amphiphile repeating units are shown in each polymer layer. In practice a larger number of repeating units is generally preferred.

For some types of devices, such as those disclosed by D. Williams and Penner et al, both cited above, and Akhemediev and Novak, Opt. Spectros. (USSR) 58 (4), 558 (1985) after deposition of a first L-B layer unit has been completed a second, overlying L-B layer unit is constructed with the sign of its second order polarization susceptibility, $\chi^{(2)}$, reversed. This is accomplished by reversing the polar orientation of the molecular dipoles M and N in the amphiphile repeating units of the second L-B layer unit as compared to the first L-B layer unit.

In X and Z type L-B assemblies reversing the polarities of the organic molecular dipoles in second L-B layer unit with respect to the first is accomplished by changing the orientation of the molecular dipole with respect to the head and tail groups. For example, if the first L-B layer unit is constructed of H—A—E—D—L amphiphile repeating unit layers, the second L-B layer unit can be formed merely by substituting H—D—E—A—L repeating unit polymer layers.

In constructing Y type L-B assemblies it is possible to reverse the orientation of the organic molecular dipoles forming the second L-B layer unit with respect to the first L-B layer unit without introducing any additional amphiphile polymer. This is achieved merely by depositing one of the amphiphile polymers on itself. Since the H—S—L amphiphile repeating units can be selected on the basis of their ability for self-adhesion, it is preferred to reverse organic molecular dipole orientation between the first and second L-B layer units by coating a spacer amphiphile polymer on itself. While only two amphiphile spacer layers are required, it is appreciated that the same result can be accomplished by coating any even number of spacer amphiphile layers. The following is an illustration of how reversal can be achieved:

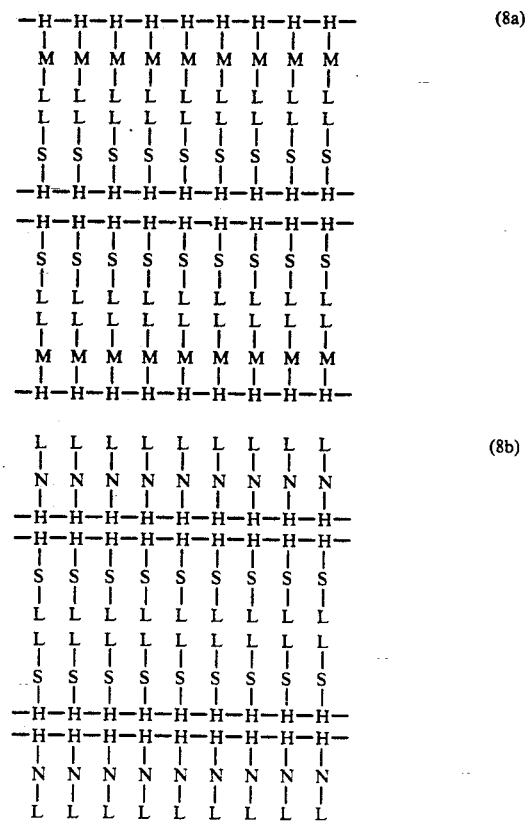

It should be noted that reversal with two repeated spacer amphiphile polymer layers can be achieved independently of the layer sequence chosen below the lower L—M—H or L—N—H amphiphile repeating unit layer or above the next succeeding L—M—H or L—N—H amphile repeating unit layer.

The amphiphile polymer repeating units used to form the polymers of the L-B layer units can take a variety of different forms, with a variety of different hydrophilic moieties (head groups) H, lipophilic moieties (tail groups) L and linking groups K, including both spacer groups S and molecular dipoles M or N.

The following are illustrative of amphiphile repeating units that can be joined through a lipophilic moiety L or a linking group K with varied hydrophilic moieties serving as head groups:

 (H-1)

 (H-2)

 (H-3)

 (H-4)

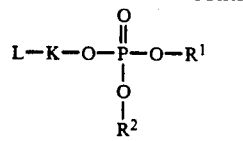 (H-5)

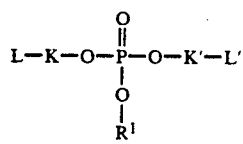 (H-6)

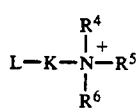 (H-7)

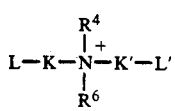 (H-8)

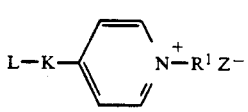 (H-9)

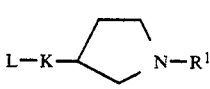 (H-10)

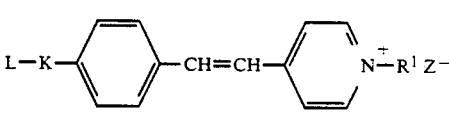 (H-11)

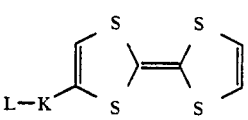 (H-12)

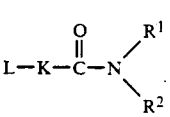 (H-13)

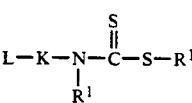 (H-14)

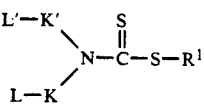 (H-15)

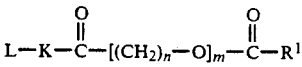 (H-16)

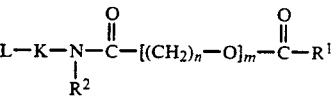 (H-17)

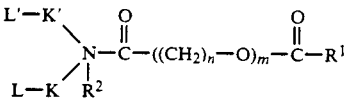 (H-18)

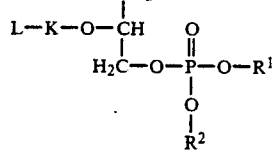 (H-19)

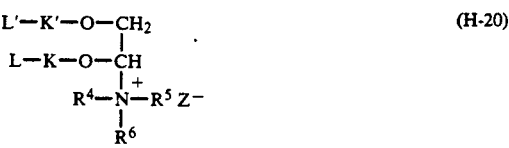 (H-20)

where
K and K' represent independently selected linking moieties;
L and L' represent independently selected moieties;
m is an integer of from 1 to 20, preferably 1 to 10 and optimally from 1 to 6;
n is an integer of from 1 to 6, preferably from 1 to 3 and optimally 2;
$R^1$, $R^2$ and $R^3$ are independently hydrogen or any synthetically convenient hydrocarbon or substituted hydrocarbon compatible with the desired hydrophilic character of the head group, these groups, when hydrocarbons, preferably being alkyl of from 1 to 10 carbon atoms, most preferably 1 to 5 carbon atoms. The alkyl groups can be substituted with common modifying groups, such as aryl, halo, hydroxy, alkoxy, and aryloxy moieties, where the alkyl moieties preferably contain from 1 to 3 carbon atoms and the aryl moieties contain from 6 to 10 carbon atoms (e.g., phenyl or naphthyl moieties);
$R^4$, $R^5$ and $R^6$ independently represent any of the same hydrocarbon or substituted hydrocarbon groups as $R^1$ and $R^2$ or any two together represent carbon and optionally oxygen atoms completing a 4 to 7 member ring (e.g., an azetidine, pyrrole, pyrroline, pyrrolidine, morpholine or azepine ring); and
Z represents a counter ion.

In addition to the simple head groups shown above it is additionally contemplated to employ head groups that are capable also as acting the electron acceptor, indicated by the prefix HA, or electron donor, indicated by the prefix HD, of the organic molecular dipole. The following are illustrative of such groups:

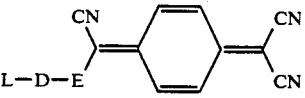 (HA-21)

L—D—E—NO$_2$ (HA-22)

L—D—E—CN (HA-23)

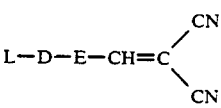 (HA-24)

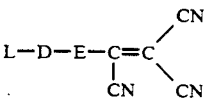 (HA-25)

L—D—E—SO$_2$—CH$_3$ (HA-26)

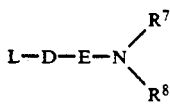 (HA-27)

where $R^7$ and $R^8$ are independently hydrogen, hydrocarbon or substituted hydrocarbon selected similarly as $R^1$ and $R^2$.

When the linking groups K function merely to provide a synthetically convenient linkage between the hydrophilic moieties H and the lipophilic moieties L, as in the amphiphiles H—S—L, they can take a wide variety of forms. While the H and L moieties are relied upon primarily to provide ambiphilic properties, linking groups are seldom entirely neutral moieties. When the linking group is a divalent hydrocarbon moiety, the demarcation between the linking group and lipophilic moiety is, of course, arbitrary. In other instances the linking group can contain one or more polar moieties, making it hydrophilic to some degree; however, the linking group is normally chosen to be less hydrophilic than the hydrophilic moiety H with which it is employed. When the linking moiety contains a hydrophilic or lipophilic portion, that portion is preferably attached to the hydrophilic or lipophilic moiety, so that it supplements the hydrophilic or lipophilic moiety in providing the desired ambiphilic properties to the molecule.

The following are representative of linking groups:

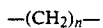 (K-1)

where n is an integer of from 1 to 24, preferably from 4 to 20;

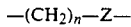 (K-2)

where n satisfies the K-1 definition and Z is a divalent oxy, —O—, thio —S— or amino —N($R^1$)—linkage with $R^1$ satisfying the definition above;

 (K-3)

where Z represents an oxo, =O, or thione, =S, atom;

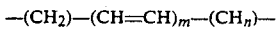 (K-4)

where l, m and n are each integers of from 4 to 20, with l+m+n preferably being no more than 20;

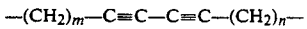 (K-5)

where m and n are each integers of from 4 to 20, with m+n preferably being from 10 to 20;

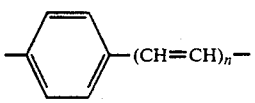 (K-6)

where n is an integer of from 1 to 10, preferably from 1 to 4;

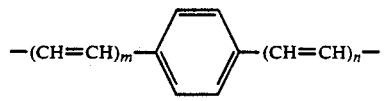 (K-7)

where m and n are each integers of from 1 to 10, preferably from 1 to 4;

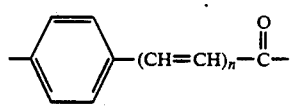 (K-8)

where n is an integer of from 1 to 10, preferably from to 4;

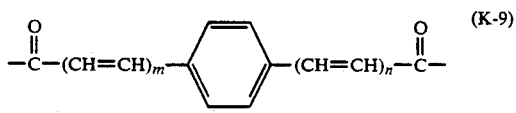 (K-9)

where m and n are each integers of from 1 to 10, preferably from 1 to 4;

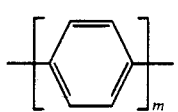 (K-10)

where m is an integer of from 1 to 5, preferably 1 or 2;

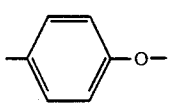 (K-11)

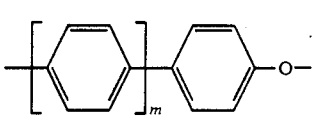 (K-12)

where m is an integer of from 1 to 5, preferably 1 or 2.

When the amphiphile contains an organic molecular dipole, —M—, the overall structure of the amphiphile can be represented as H—A—E—D—L or H—D—E—A—L. In the majority of instances the electron acceptor moiety is itself sufficiently hydrophilic to be employed as a head group. Thus, in particular embodiments of the invention, the preferred electron acceptor moieties for forming the H—A—E—D—L amphiphile repeating units are those described above identified by the prefix HA. An amine structure, HD-26, is shown above capable of acting as both a donor and a head group; however, electron donor moieties are in general not strongly hydrophilic moieties. When employed to form an H—D—E—A—L amphiphile repeating unit, the electron donor moiety D is preferably employed with one of the hydrophilic groups identified above by the prefix H. In addition to amines, exemplary electron donor moieties contemplated include oxy, —O—, and thio, —S—, moieties directly linked to a carbon atom of E and a carbon atom of H or L. The amine structure of HD-26, above can be converted to a L—D—structure by replacing one or both of $R^1$ and $R^2$ with a more lipophilic group L of the type described above.

The electron acceptor —$SO_2$—particularly lends itself to forming H—D—E—A—L amphiphile repeating units, since, unlike the other electron acceptors listed above, it lends itself to —A—L structures, such as $$H-D-E-SO_2-R^9 \qquad (S-1)$$

where
$R^9$ is $T^1$ or $T^2$.

$T^1$ can be a multicarbon atom hydrocarbon or substituted hydrocarbon of the type described above for use as L groups, preferably those containing at least 5 carbon atoms and optimally at least 10 carbon atoms. $T^2$ requires a difluoro-substituted carbon atom attached to the sulfonyl, —$SO_2$—, moiety—that is, the $\alpha$ carbon atom. When $R^9$ takes the form of $T^2$, the structure can be represented as follows:

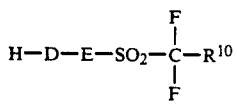

$$(S-2)$$

where $R^{10}$ can be hydrogen, fluorine, or any hydrocarbon or substituted hydrocarbon described above as being useful as a lipophilic moiety, but preferably is a hydrocarbon containing less than 10 and optimally less than 5 carbon atoms.

When the $\alpha$ carbon atom is difluoro substituted, the second order polarizability $\beta$ of the molecule is enhanced. In addition the fluoro substituents markedly increase the hydrophobicity of the sulfonyl substituent. This allows the number of carbon atoms required to form the lipophilic moiety L to be reduced. For example, the moiety —$SO_2CH_3$ has been noted above to be a hydrophilic electron acceptor moietys—i.e., an HA—moiety—i.e., an LA—moiety. a lipophilic acceptor moiety—i.e., an LA—moiety. Further the trifluoromethylsulfonyl moiety is a much more efficient electron acceptor than the methylsulfonyl moiety. Additional fluoro substitutions of $\beta$ and $\gamma$ carbon atoms increase the lipophilic character of the moieties satisfying formula S-2, but make progressively smaller additional contributions to second order polarizability.

The linking group E between the electron donor D and electron acceptor A can take the form of a conjugated $\pi$ bonding linkage of any convenient type. In the linking groups described above K-6, K-7 and K-10 provide the required conjugated $\pi$ bonding linkage. The conjugated $\pi$ bonding linkages of K-4, K-8, K-9 and K-12 are, of course, not useful in forming organic molecular dipoles, since the conjugation is interrupted by one or more nonconjugated linkages. This prevents resonance between an excited state and a ground state required for useful organic molecular dipoles.

In particular embodiments of the invention, the preferred conjugated $\pi$ bonding linkages E between the electron donor D and electron acceptor A moieties the terminal portions of the linkage are aromatic. In choosing a linkage E for an organic molecular dipole a number of factors must be taken into account in addition to the conjugated $\pi$ bonding linkage. Increasing the length of the linkage tends to increase the dipole moment and to shift electromagnetic radiation absorption to longer wavelengths, both of which are beneficial, but this must be balanced against reducing the resonance efficiency of the organic molecular dipole, which occurs as the conjugated $\pi$ bonding linkage is lengthened.

The following are preferred linking groups E:

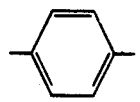

(E-1)

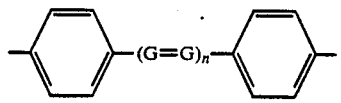

(E-2)

where G is independently in each occurrence methine or substituted methine, —$CR^{11}$—, or aza; $R^{11}$ is hydrogen or alkyl of from 1 to 3 carbon atoms; n is from 1 to 3 and optimally 1; with the further proviso that no more than two aza moieties are next adjacent.

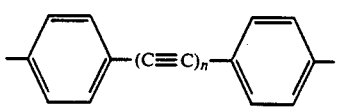

(E-3)

where n is as defined for E-2.

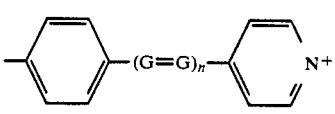

(E-4)

where G and n are as defined for E-2 and $X^-$ is a counter ion.

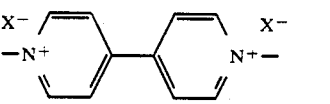

(E-5)

where $X^-$ is a counter ion.

In addition to the conjugated $\pi$ bonding linkages E shown above that are generally useful with terminal L—A—, H—A—, L—D—and H—D—moieties of the type described above, other linking groups particularly useful with sulfonyl electron acceptor moieties of the type disclosed by Ulman et al U.S. Pat. No. 4,792,208, the disclosure of which is here incorporated by reference, are specifically contemplated. In the linking groups E-1 to E-5 no substituents to the various aromatic rings are shown. However, any of the $R^a$ and $R^d$ ring substituents of Ulman et al can be employed, if desired.

Stilbene linking groups E as well as their pyridinium analogues have been observed to provide an optimum balance of synthetic convenience and optical advantages. The following are illustrations of organic molecular dipoles of employing these types of linking groups that have been observed to be particularly useful:
(MD-1);
4-(N-Methyl-N-octadecylamino)-4'-nitrostilbene
(MD-2);
4-(N,N-Dioctadecylamino)-4'-methylsulfonylstilbene
(MD-3);
4-{2-[4-(N,N-Dimethylamino)phenyl]ethenyl}-N-octadecylpyridinium chloride (MD-4);
4-{2-[4-(N,N-Dimethylamino)phenyl]ethenyl}-N-docosanylpyridinium sulfate
(MD-5);
6-(N-methyl-N-[4-(4'-octadecylsulfonyl)stilbene]amino}hexanoic acid
(MD-6);
4-(N-Methyl-N-(3,6-dioxyoctan-8-ol)amino-4'-octadecylsulfonylstilbene In particular embodiments of the invention, preferred L-B spacer amphiphile repeating units H—S—L are saturated and mono-unsaturated fatty acids containing from 16 to 24 carbon atoms, including hexadecanoic, octadecanoic, eicosanoic, docosanoic, 22-tricosenoic and tetradecanoic acids. Phosphates, such as [CH$_3$(CH)$_{12}$(CH=CH)$_2$C(O)O(CH$_6$)O]$_2$P(O)OH and [CH$_3$(CH)$_4$OC(O)CH=CH(p—C$_6$H$_4$)CH=CH)-C(O)O(CH$_6$)—O]$_2$P(O)OH, are specifically contemplated for use as spacer units.

The lipophilic moieties or tail groups L are nonpolar groups. Depending upon the group to which the lipophilic moiety is attached, an alkyl group of from 1 to 3 carbon atoms (e.g., a methyl, ethyl or propyl group) can function effectively as a lipophilic moiety. In particular embodiments of the invention, preferred lipophilic moieties are hydrocarbons that contain a least four carbon atoms, including alkyl, cycloalkyl, alkenyl groups, cycloalkenyl, aryl, alkaryl, and aralkyl moieties. To avoid excessive bulk the hydrocarbon lipophilic moieties are preferably limited to 24 or fewer carbon atoms. In particular embodiments of the invention, alkyl and alkenyl groups of from about 4 to 20 carbon atoms are preferred. Aryl groups, such as phenyl, naphthyl and biphenyl, are specifically contemplated. In particular embodiments of the invention, preferred cycloalkyl groups are those that contain from 5 to 7 ring carbon atoms. Halogen substitution of the hydrocarbons is recognized to increase their lipophilic properties. Fluorosubstituted hydrocarbons are specifically recognized to be highly lipophilic.

It has been discovered quite unexpectedly that when the repeating units of at least one of the first and second amphiphile polymers contain a branched lipophilic moiety L of up to 9 carbon atoms the optical attenuation within the organic layer unit formed by the Y type L-B assembly is exceedingly low. Specifically, optical attenuation levels are reduced to less than 2 dB/cm. In particular embodiments of the invention, preferred that both of the lipophilic moieties be formed of a branched hydrocarbon of 9 or fewer carbon atoms, particularly when each of the polymeric amphiphiles forming the Y type L-B assembly contains an organic molecular dipole moiety. In a specifically preferred form the branched lipophilic moiety exhibits the structure:

(9)

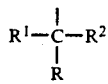

where
R is hydrogen or a hydrocarbon and
R$^1$ and R$^2$ represent separate hydrocarbons or together complete a cyclic hydrocarbon. The branched lipophilic moiety can be chosen from among 2-propyl, 2-butyl, 2-(2-methylpropyl), 2-(2-methylbutyl), 2-(2-ethylbutyl), 2-(3-methylbutyl), 2-pentyl, 2-(2-methylpentyl), 2-(3-methylpentyl), 3-pentyl, 3-(2,4-dimethylpentyl), 3-(3-ethylpentyl), 2-hexyl, 2-(2-methylhexyl), 2-(3-methylhexyl), 2-(4-methylhexyl), 2-(3-ethylhexyl), 2-(4-ethylhexyl), 2-heptyl, 4-heptyl, 4-(3-ethylheptyl), cyclopentyl, cyclohexyl, phenyl, tolyl, xylyl, ethylphenyl, norboranyl or similar cyclic and acylic branched hydrocarbons. As noted above, corresponding halohydrocarbon and halocarbon lipophilic moieties are even more lipophilic.

The foregoing elaboration of amphiphile repeating units has focused on moieties that are not responsible for linking adjacent repeating units. However, it is apparent that each amphiphile repeating unit must contain one hydrophilic moiety H, linking moiety K or lipophilic moiety L that links adjacent repeating units. When the linking moiety K contains an organic molecular dipole M or N, further complication of the linking group by providing bonding sites for adjacent repeating units is not preferred. When the lipophilic moiety L is a branched lipophilic moiety of 9 or fewer carbon atoms, particularly a structure satisfying structure (9) above, the lipophilic moiety is not a convenient site for linking adjacent repeating units. An exception to this occurs when L is styryl repeating unit. In particular embodiments of the invention, the hydrophilic moiety H is a desirable moiety for linking adjacent amphiphile repeating units of the polymers. However, in looking at the linking portion of actual repeating units, it is apparent that a wide diversity of forms are possible.

The following are representative polymeric amphiphile repeating units showing in detail the sites for joining adjacent units contemplated for use in forming L-B layer units:

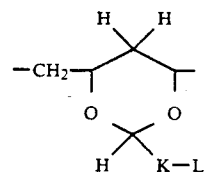 (P-1)

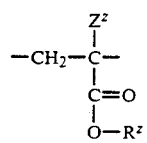 (P-2)

where R$^z$ represents —L or —K—L and Z$^z$ represents hydrogen, methyl, ethyl or cyano;

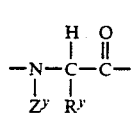 (P-3)

where R$^y$ represents —L or —K—L when Z$^y$ is hydrogen or alkyl of from 1 to 3 carbon atoms and Z$^y$ represents —L or —K—L when R$^y$ is hydrogen or alkyl of from 1 to 3 carbon atoms;

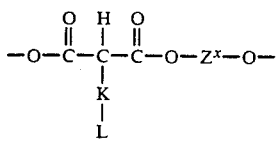 (P-4)

where $Z^x$ represents a divalent hydrocarbon containing from 1 to 12 carbon atoms (e.g., an alkanediyl, an alkenediyl, a cycloalkanediyl, phenylene, etc.);

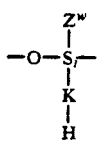 (P-5)

where $Z^w$ represents a hydrocarbon group of from 1 to 12 carbon atoms (e.g. alkyl or phenyl);

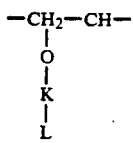 (P-6)

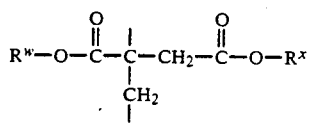 (P-7)

where one of $R^w$ and $R^x$ represents —K—L with the other being —K'—L' or any synthetically convenient lipophilic (—L) or hydrophilic (—H) moiety;

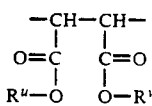 (P-8)

where one of $R^u$ and $R^v$ represents —K—L with the other being —K'—L' or any synthetically convenient lipophilic (—L) or hydrophilic (—H) moiety;

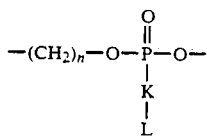 (P-9)

where n is an integer of from 2 to 4;

 (P-10)

where one of $R^s$ and $R^t$ represents —K—L with the other being —K'—L' or any synthetically convenient lipophilic (—L) or hydrophilic (—H) moiety;

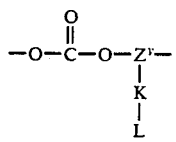 (P-11)

where $Z^v$ represents a trivalent hydrocarbon group of from 1 to 10 carbon atoms (e.g., a —K—L substituted alkanediyl or phenylene);

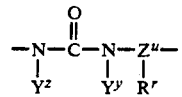 (P-12)

where at least one of $R^r$, $Y^y$ and $Y^z$ is —K—L and with any of $R^r$, $Y^y$ and $Y^z$ that are not —K—L being any synthetically convenient atom or group (e.g. hydrogen or alkyl or aryl of from 1 to 10 carbon atoms) and $Z^u$ represents a trivalent hydrocarbon group of from 1 to 10 carbon atoms (e.g., a substituted alkanediyl or phenylene);

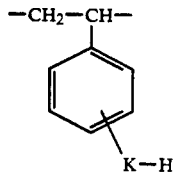 (P-13)

 (P-14)

where at least one $R^p$ and $R^q$ is —K—H and the remaining of $R^p$ and $R^q$ is —K'—H' or any synthetic convenient lipophilic, —L, or hydrophilic, —H, moiety;

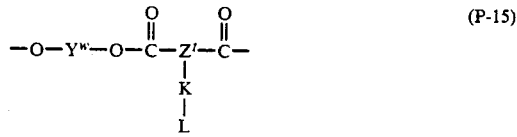 (P-15)

where $Y^w$ is a divalent hydrocarbon of from 1 to 12 carbon atoms (e.g. alkanediyl or phenylene) and $Z^t$ represents a trivalent hydrocarbon group of from 1 to 10 carbon atoms (e.g., a substituted alkanediyl or phenylene);

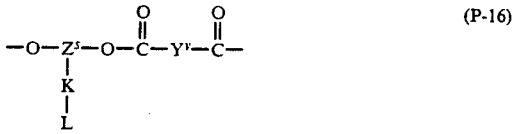 (P-16)

where $Y^v$ is a divalent hydrocarbon of from 1 to 12 carbon atoms (e.g. alkanediyl or phenylene) and $Z^s$ represents a trivalent hydrocarbon group of from 1 to 10 carbon atoms (e.g., a substituted alkanediyl or phenylene);

 (P-17)

where $Z^s$ is as previously defined;

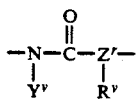 (P-18)

where $R^v$ represents —K—L when $Y^v$ is hydrogen or alkyl of from 1 to 3 carbon atoms and $Y^v$ represents —K—L when $R^v$ is hydrogen or alkyl of from 1 to 3 carbon atoms and $Z^r$ represents a trivalent hydrocarbon group of from 1 to 10 carbon atoms (e.g., a substituted alkanediyl or phenylene);

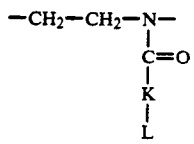 (P-19)

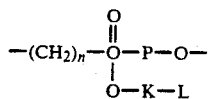 (P-20)

where n is the integer 2, 3 or 4;

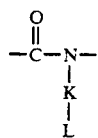 (P-21)

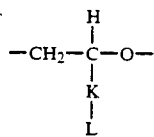 (P-22)

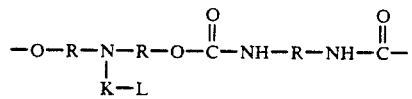 (P-23)

where R is —$(CH_2)_n$— or —$(CH_2OCH_2)_m$— and n and m are integers of from 1 to 6;

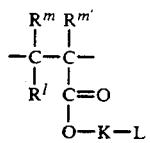 (P-24)

where $R^l$, $R^m$ and $R^{m'}$ can be independently hydrogen or any synthetically convenient hydrophilic, —H, or lipophilic, —L, moiety;

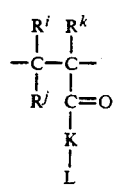 (P-25)

where $R^i$, $R^j$ and $R^k$ can be independently hydrogen or any synthetically convenient hydrophilic, —H, or lipophilic, —L, moiety;

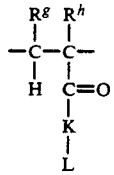 (P-26)

where $R^g$ and $R^h$ can be independently hydrogen or any synthetically convenient hydrophilic, —H, or lipophilic, —L, moiety;

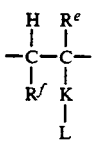 (P-27)

where $R^e$ and $R^f$ can be independently hydrogen or any synthetically convenient hydrophilic, —H, or lipophilic, —L, moiety;

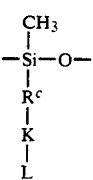 (P-28)

where $R^c$ is any synthetically convenient divalent hydrocarbon of from 1 to 12 carbon atoms (e.g., alkanediyl or phenylene).

The following are illustrative of polymers containing H—M—L repeating units linked through either the —H or —L moieties:

(PM-1):
Poly{4'-N-methyl-N-[2-(2-acryloyloxethoxy)ethoxy]ethylamino-4-octadecylsulfonyl azobenzene}

(PM-2):
Poly{4'-N-methyl-N-[2-(2-acryloyloxethoxy)ethoxy]ethylamino-4-octadecylsulfonyl azobenzene-co-2-hydroxyethyl acrylate} [1:4-6 mole ratio]

(PM-3):
Poly{4'-dioctadecylamino-4-(6-acryloyloxy)hexylsulfonyl azobenzene-co-2-hydroxyethyl acrylate} [1:4-6 mole ratio]

(PM-4):
Poly{4'-N-methyl-N-(8-acryloyloxy)octylamino-4-octadecylsulfonyl azobenzene-co-N,N-dimethyl acrylamide}[1:4-6 mole ratio]

(PM-5):
Poly{N-[2-(hexamethyleneiminocarbonyloxy)ethyl]-N-[2-(iminocarbonyloxy)ethyl]-N-[4-(4'-octadecylsulfonlazobenzene]amine}

(PM-6):
Poly{1-N-methyl-N-[6-(acryloyloxy)hexylamino-4-perfluorodecylsulfonylphenyl]-co-2-hydroxyethyl acrylate} {1 to 1.2 mole ration}

Polymer PM-6 is a preferred H-M-L polymer for the claimed invention, polymers PM-1 to PM-5 are not preferred.

The following are illustrative of polymers containing H—S—L repeating units linked through either the —H or —L moieties:
(PS-1):

Poly(t-butyl methacrylate)
(PS-2):
Poly(i-butyl methacrylate)
(PS-3):
Poly[2-(methacryloyloxy)ethoxysuccinoyl-N,N-dioctadecylamide-co-2-hydroxyethyl acrylate] [5-10:1 mole ratio]
(PS-4):
Poly[oxy(dioctadecyl)malonyloxyethyloxyethyl]
(PS-5):
Poly[oxyadipoyloxy(2,2-dioctadecyl)propylene]
(PS-6):
Poly[oxycarbonyliminehexamethyleneiminocarbonyloxy(2,2-dioctadecylpropylene)]
(PS-7):
Poly(γ-methyl-L-glutamate-co-γ-n-octadecylglutamate)

From a review of the various polymers listed above it is apparent that in most instances the hydrophilic and lipophilic moieties can be present before polymerization. It therefore follows that in most instances the monomers from which the polymers are formed are themselves amphiphiles. The degree of polymerization can vary widely, ranging from dimers through oligomers and lower molecular weight polymers with maximum molecular weights being limited only by the ability of the polymers to retain their fluid properties under L-B assembly construction conditions. It is generally preferred to employ polymers that have molecular weights of less than about 20,000. The polymers can be homopolymers or polymers that contain mixtures of repeating units with compatible Langmuir-Blodgett film-forming properties.

The Y type L-B assemblies described above are ideally suited to form the organic layer unit of a variety of high second order polarization susceptibility optical articles.

Device A

Second Harmonic Generator

An optical article 100 capable of efficiently converting polarized electromagnetic radiation of a selected wavelength to a second harmonic wavelength is shown in FIG. 1. Polarized electromagnetic radiation of a selected wavelength supplied to the article is schematically indicated by the arrow λ while electromagnetic radiation of a second harmonic wavelength emanating from the device is schematically indicated by arrow λ/2.

The optical article is shown comprised of a support made up of portions 101 and 103. The sole required function of support portion 101 is to offer structural integrity to the device. Any convenient substrate material can be used as this purpose. In a simple device construction the materials satisfying the requirements of support portion 103 also have the capability of lending structural integrity to the device. In this instance support portions 101 and 103 can be different portions of a single unitary element.

Support portion 103 is selected to be optically transparent to both λ and λ/2, thereby avoiding optical attenuation during transmission through the device. In addition support portion 103 is selected for its ability to support a Langmuir-Blodgett film on its major surface 105. Support portion 103 can be selected so that major surface 105 is either hydrophilic or oleophilic.

Formed on the major surface of the support is an organic layer unit 107. A prism 109 is shown as a means for coupling polarized electromagnetic radiation λ into the organic layer unit while prism 111 is shown as a means for coupling polarized electromagnetic radiation λ/2 out of the organic layer unit.

The organic layer unit is capable of acting as a transmission medium for the electromagnetic radiation λ, concurrently efficiently converting a portion of this electromagnetic radiation to λ/2, and acting as a transmission medium for the electromagnetic radiation λ/2. To accomplish these three functions the organic layer unit must be transparent or near transparent to each of λ and λ/2. This, coupled with the optical transparency of support portion 103, avoids internal attenuation within the device. The surfaces as well as the interior of the organic layer unit must be smooth and essentially defect free to avoid scattering or otherwise disrupting the electromagnetic radiation as it is being transmitted. Additionally, the thickness of the organic layer unit must be at least 70 percent of λ to contain adequately the electric field of λ as it is being guided through the device. Taking these requirements into account, the articles of the invention with organic layer unit thicknesses in the range of from about 1.6 μm to 600 nm particularly lend themselves to use with lasers having outputs in the 1.9 μm to 830 nm wavelength range. In a particular embodiment of the invention disclosed in Example 7, the organic layer unit and support exhibit a transmission attenuation of less than 2 dB/cm for electromagnetic radiation having a wavelength between 400 and 500 nanometers. In that embodiment, articles of the invention with organic layer unit thicknesses in the range of from about 1.2 μm to 600 nm particularly lend themselves to use with lasers having outputs in the 1.0 μm to 800 nm wavelength range.

To be capable of internally producing λ/2, the organic layer unit must exhibit an absolute second order polarization susceptibility, $\chi^{(2)}$, of greater than $10^{-9}$ electrostatic units. This in itself is not, however, sufficient to achieve a high conversion efficiency. If, instead of the specific construction described below, the organic layer unit consisted of one uniform layer having the requisite $\chi^{(2)}$, the device would be operative, but highly inefficient. One reason for this can be appreciated by the manner in which λ and λ/2 are propagated within the organic layer unit. The maximum positive amplitude profile of the electric field of λ is shown at 113, where axis 115 represents zero amplitude. At a second location in the organic layer unit in phase with the amplitude profile 113 the corresponding amplitude profile of the electric field of λ/2 is shown at 117a and 117b, where axis 119 represents zero amplitude. While lobe 117a represents a maximum positive amplitude profile, lobe 117b represents a maximum negative amplitude profile. Thus, the net amplitude of the electric field of λ/2 integrated across the total thickness of the organic layer unit is zero.

This in turn means that the conversion efficiency of the organic layer unit integrated over its entire thickness is also zero, as illustrated by equation 10:

$$v = [S E_\lambda(z) E_{\lambda/2}(z) \chi^{(2)} dz]^2 \quad (10)$$

where
v is the conversion efficiency;
$\chi^{(2)}$ is the second order polarization susceptibility of the organic layer unit;
$E_\lambda$ is the electric field amplitude of λ;

$E_{\lambda/2}$ is the electric field amplitude of $\lambda/2$;
∫ represents an integral sign; and
z is the thickness of the organic layer unit.

Notice that a real conversion from the $\lambda$ wavelength to the $\lambda/2$ wavelength occurs within the organic layer unit. If electromagnetic radiation output of the organic layer unit is sampled over only a portion of its thickness, a measurable conversion from to $\lambda$ to $\lambda/2$ can be observed. However, the magnitude of the conversion efficiency is exponentially lowered in comparison to that which might be realized if noncancelling amplitudes could be obtained over the full thickness of the organic layer unit.

In the present invention the organic layer unit is divided into two separate Langmuir-Blodgett layer units. The first Langmuir-Blodgett layer unit 121 is formed on the major surface 105 of the support. The second Langmuir-Blodgett layer unit 123 is formed on the first L-B unit 121. As shown, the second L-B layer unit includes an interface layer unit 125 to facilitate its formation on the first layer unit. The function of the interface layer unit is to facilitate adhesion of the first-deposited layer of the second L-B layer unit to the last-deposited layer of the first L-B layer unit. Where adhesion is adequate in the absence of the interface layer unit, it can, of course, be omitted.

The purpose of constructing the organic layer unit of two separate L-B layer units is to permit the organic molecular dipoles in the first and second L-B layer units to be oppositely oriented. This is schematically illustrated by the oppositely oriented arrows 127 and 129 in the first and second L-B layer units, respectively. Although the arrows are shown in their ideal perpendicular (90°) orientation to the major surface 105 of the support, it is appreciated that orientations of the molecular dipoles at angles down to about 50° are not uncommon.

By reversing the polarity of the organic molecular dipoles in the second L-B layer unit with respect to those in the first L-B layer unit the sign of the second order polarization susceptibility, $\chi^{(2)}$, in the second L-B layer unit is opposite that of the first L-B layer unit. By resolving the conversion efficiency of equation (10) into two separate integrations (10a) for the first L-B layer unit having a thickness z/2 and (10b) for the second L-B layer unit having a thickness z/2, the following relationships are observed:

$$v = [\int E_\chi(z/2)(-E)_{\lambda/2}(z/2)(-\chi^{(2)})dz/2]^2 \quad (10a)$$

$$v = [\int E_\chi(z/2)(-E)_{\lambda/2}(z/2)(-\chi^{(2)})dz/2]^2 \quad (10a)$$

By reversing the sign of the $\chi^{(2)}$ in the first L-B layer unit in relation to that in the second L-B layer unit the opposite amplitude polarities are offset to produce conversion efficiencies in each of the L-B layer units that are non-cancelling. Thus constructing the organic layer unit as two separate L-B layer units as described eliminates a fundamental barrier to achieving high conversion efficiencies.

Although the description above has for simplicity been based on each of the two L-B layer units contributing exactly half the thickness of the organic layer unit, it is appreciated that increased conversion efficiencies occur from any apportionment of total organic layer unit thickness between the two L-B layer units. Significant improvements in conversion efficiencies can occur with the thickness of either L-B layer unit ranging up to 90 percent of the total organic layer unit thickness. It is preferred that the L-layer units individually account for from 40 to 60 percent of the total organic layer unit thickness, optimally 45 to 55 percent of the total organic layer unit thickness.

While the structural features described above remove barriers to improved conversion efficiencies, additional structural features are required to realize high conversion efficiencies. As electromagnetic radiation $\lambda$ is propagated within the organic layer unit a portion of it is converted to its second harmonic $\lambda/2$. Transmission over one coherence length, a very small distance (typically less than 10 micrometers), converts only a very small portion of $\lambda$ to $\lambda/2$. To achieve a significant conversion of $\lambda$ to its second harmonic $\lambda/2$ further propagation within the organic layer unit is required. Unfortunately, unless the transmission velocities of and $\lambda/2$ are equal, transmission through a second coherence length within the organic layer unit reconverts a portion of $\lambda/2$ back to its original wavelength $\lambda$.

The organic layer units of the optical articles are constructed to allow the propagation rates of $\lambda$ and $\lambda/2$ to be at least approximately matched within the organic layer unit. To explain how this is accomplished, it is necessary to describe the polarized source of electromagnetic radiation $\lambda$ in somewhat greater detail. The optical articles include the structure required to supply polarized electromagnetic radiation $\lambda$ to the organic layer unit in its zero order transverse magnetic mode $TM_o$. This orients the electric field of $\lambda$ perpendicular to the major surface 105 and achieves a highly efficient interaction with the molecular dipoles of the L-layer units. The electromagnetic radiation $\lambda/2$ is produced by conversion of $\lambda$ from its $TM_o$ mode to its $TM_1$ mode.

It is necessary to make a specific selection of the conversion modes, in this instance $TM_o$ to $TM_1$, to be able to construct the organic layer unit for high conversion efficiency. The rate of transmission of electromagnetic radiation of a given wavelength in a bulk medium is a function of the refractive index of the medium. It is generally recognized that the numerical value of a refractive index for a bulk transmission medium is dependent on the wavelength of the electromagnetic radiation being propagated. Thus, $TM_o$ and $TM_1$ can be expected to propagate at different rates in bulk transmission media. For thin films, such as those contemplated for use in the practice of this invention, observed (i.e., measured) refractive indices are referred to as "effective refractive indices", since they are dependent on the thickness of the film. Since this invention is concerned with matching the propagation rates of $TM_o$ and $TM_1$, the propagation constants of the organic layer units are the parameter of choice for comparison, where the propagation constant is the product of the effective refractive index and wavenumber of the electromagnetic radiation of interest in free space ($\omega/c$, where $\omega$ is the angular frequency of the electromagnetic radiation and c is its speed).

By constructing organic layer units otherwise satisfying the requirements of this invention of varied thicknesses a plot of propagation constants versus thickness for each of $TM_o$ and $TM_1$ can be obtained. This thickness of the organic layer unit that produces identical $TM_o$ and $TM_1$ propagation constants is the ideal thickness for the organic layer unit of the optical article of the invention. In practice the ideal thickness cannot be reproducibly achieved. However, if the thickness of the organic layer unit differs by less than 100 Å from that required for identical propagation constants of the $TM_o$ and $TM_1$ modes, a relatively high conversion efficiency from the $TM_o$ to the $TM_1$ mode can be realized.

Device B

Alternative Second Harmonic Generator

An alternative second harmonic generating device construction can be identical to Device A, described above, except that the thicknesses of the organic layer units are chosen so that conversion occurs from the zero order transverse electric mode, $TE_o$, to the first order transverse magnetic mode, $TM_1$. Devices to achieve $TE_o$ to $TM_1$ conversion are disclosed by Akhemediev and Novak, Opt. Spectros. (USSR) 58 (4), 558 (1985) and *Electronic and Photonic Applications of Polymers*, M. J. Bowden and S. R. Turner Ed., Chapter 6, Polymers in Nonlinear Optics, by D. Williams, American Chemical Society 1988, the disclosures of which are here incorporated by reference. The advantages which the present invention offers over the disclosures of Akemediev and Novak and D. Williams flow from the Y type L- assemblies described above for forming the organic layer units.

Device C

Optical Article for Reflection Modulation

Figure 2:
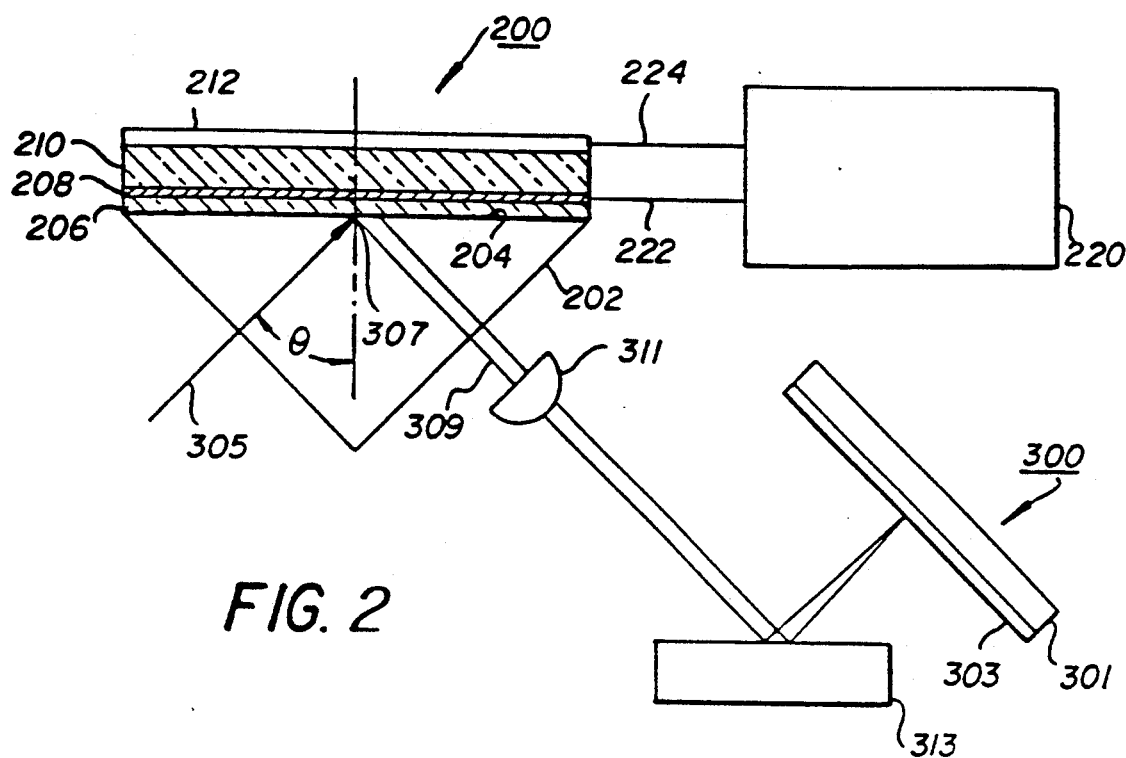
FIG. 2 is an elevation, partly in section, of a second optical article satisfying the requirements of the invention.
Figure 3:
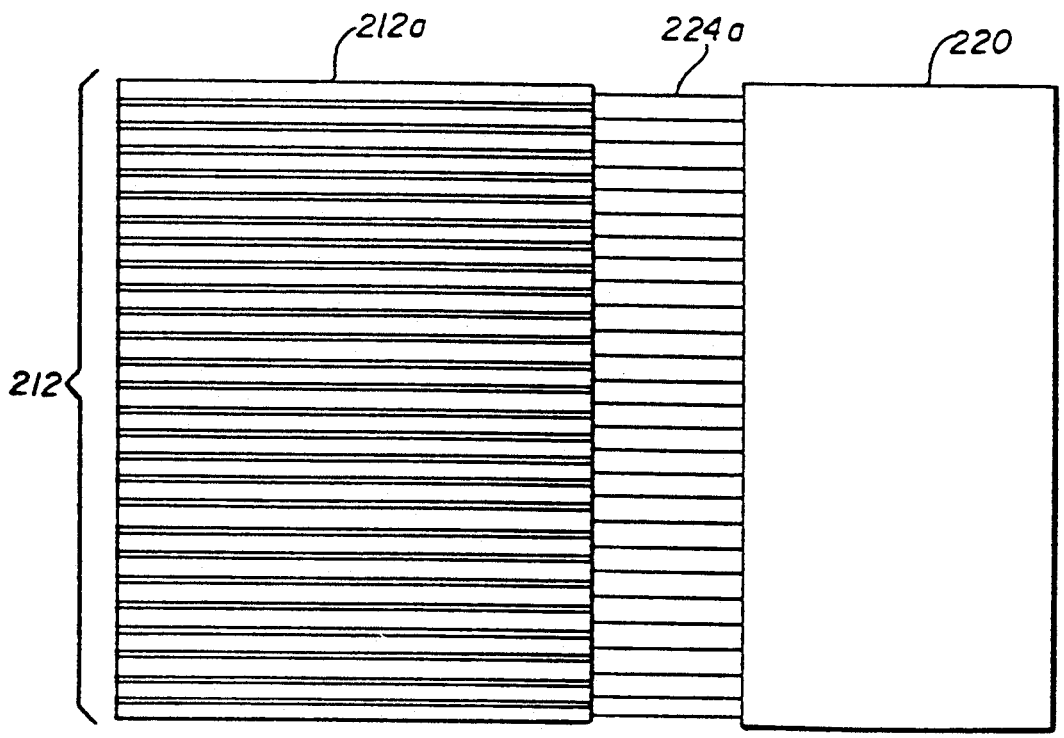
FIG. 3 is a plan view of the optical article of FIG. 2.

Referring to FIGS. 2 and 3, a modulator 200 is shown consisting of a prism 202, which serves a support for the device. On the base 204 of the prism is located a dielectric layer 206 having a lower index of refraction than the prism, a reflective metal layer 208, an electrooptic medium 210 in the form of a Y type L- assembly polymeric organic layer unit constructed according to the invention as discussed above, and a counter electrode 212 divided into a plurality of laterally spaced segments of which segment 212a is representative. The modulator is shown attached to an imaging controller 220. An electrical conduction path from the controller to the reflective metal layer is indicated at 222. A plurality of electrical conduction paths 224 are shown each connecting the controller to one of the counter electrode segments. Representative conduction path 224a is shown connected to counter electrode segment 212a.

By selectively controlling the potential difference between the metal reflective layer and each of the individual segments of the counter electrode it is possible to bias the modulator so that in selected segment areas the modulator exhibits maximum reflection of polarized monochromatic electromagnetic radiation directed toward it and in other selected segment areas the modulator exhibits minimum reflection of that same radiation. By using just maximum and minimum reflection biasing it is possible to produce half tone images. It is also possible to modulate reflection intensity over the full range from maximum to minimum reflection to produce continuous tone images.

Use can be illustrated by considering the exposure of a photographic element 300, comprised of a support 301 and an image recording portion 303 coated on the support, by reflections from the modulator in areas controlled by representative counter electrode segment 312a. As shown in FIG. 2 the modulator is addressed by a beam of polarized monochromatic electromagnetic radiation indicated by arrow 305 directed at a point of incidence 307 with the dielectric layer 206 in an area of the modulator underlying selected segment 212a. The beam forms an angle of incidence $\theta$ measured from an axis normal to the dielectric layer. The potential biasing supplied by the controller 220 to the reflective metal layer 208 through conduction path 222 and the counter electrode segment 212a through conduction path 224a is as shown intermediate between that required for either maximum or minimum reflection. A portion of the incident electromagnetic radiation is propagated within the modulator along the interfaces of the reflective metal layer as a long range surface plasmon or the electrooptic medium as a guided mode. This occurs because the potential gradient applied by the counter electrode segment 212a has resulted in locally adjusting the refractive index of the electrooptic medium 210 to a level that permits coupling of the wavefronts at the opposite interfaces of the reflective metal layer.

When the potential difference is adjusted for optimum internal propagation, very little, if any, of the incident beam is reflected from the device. When the potential difference is adjusted to prevent internal propagation, the incident beam is specularly reflected from the device with no significant spreading.

With intermediate biasing, as shown, the reflected beam 309 is slightly spread in the direction of propagation within the device, since evanescent fractions of the electromagnetic radiation can emerge from the device at displacements of up to 100 mm from the point of incidence. However, the intensity of the reflected beam falls off sharply with its displacement from the point of incidence. No significant spreading of the incident beam normal to the longitudinal axis of the segment 212a occurs, since the beam lacks lateral propagation momentum. Hence, no significant lateral spreading of electromagnetic radiation between counter electrode segment areas occurs.

A lens 311 is provided to focus the reflected beam for exposure of the image recording portion of the photographic element. Since beam spreading occurs in only one plane, a hemicylindrical lens is sufficient to focus the reflected beam incident upon the image recording portion 303 of the photographic element 300. As shown a mirror 313 is positioned to intercept and reflect the beam 309 to the image recording portion of the photographic element.

If beam 305 is essentially a point source of electromagnetic radiation, imagewise exposing the photographic element requires sequentially addressing the various segment areas of the modulator and reflecting the beam 309 to different areas of the photographic element by adjusting the relative positioning of one or more of the beam 305, the modulator 200, the lens 311, the mirror 313 and the photographic element 300.

The simplest and preferred scanning approach the beam 305 is a laterally expanded line that concurrently impinges on all of the segment areas of the modulator, but over only a narrow portion of each segment area. The hemicylindrical lens 311 now transfers a line exposure to the mirror 313 and the photographic element 300 in one step. Between each successive laterally displaced line exposure of the photographic element, the biasing of the segments of the electrode 212 are adjusted to permit selective internal propagation or reflection as required for imaging and the mirror 313 is reoriented. This approach offers the advantage that the beam 305, modulator, lens and photographic element all remain in a fixed relative spatial relationship during imaging and the mirror alone requires physical manipulation.

The angle at which the beam 305 strikes the dielectric layer 206 determines whether the modulator internally propagates the beam by generating long range surface plasmons or internally guided modes. At the highest angle of incidence $\theta$ that produces internal propagation internal long range surface plasmon propagation occurs. At lower values of $\theta$ internal guided mode propagation occurs. A choice of angles are available for achieving guided mode operation. Generally best results are achieved at the first (zero order) guided mode angle first encountered following the long range surface plasmon producing angle. Appropriate angles of incidence of the polarized monochromatic electromagnetic radiation can be calculated from known physical relationships. Optimum angles can also be readily determined simply by varying the angles of incidence and observing the optimum angles for modulation.

Although the prism 202 is shown as the support for the modulator, it is appreciated that the optical articles of this invention can be formed on any convenient conventional optical coupling element. For example, the prism can be replaced with an optical grating.

A device similar to Device C, but lacking the Y type L-B assembly construction of the invention to form the electrooptic medium, is disclosed in Schildkraut et al U.S. Ser. No. 583,638, filed Sep. 17, 1990, commonly assigned, titled OPTICAL ARTICLE FOR REFLECTION MODULATION.

Device D

Optical Article for Multicolor Imaging

Figure 4:
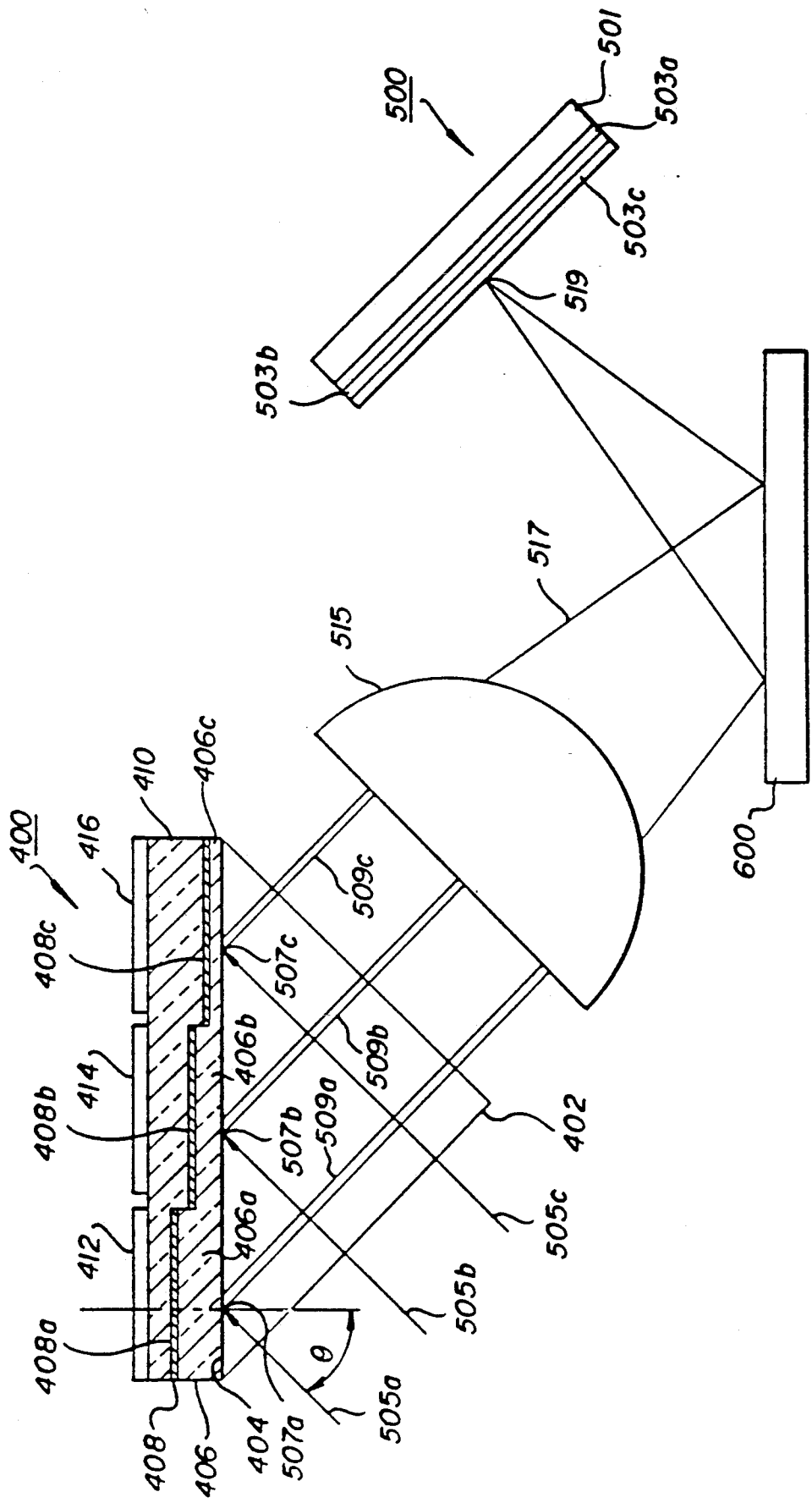
FIG. 4 is an elevation, partly in section of a third optical article satisfying the requirements of the invention.

Referring to FIG. 4, a modulator 400 is shown consisting of a prism 402, which serves a support for the device. On the base 404 of the prism is located a dielectric layer 406 having a lower index of refraction than the prism. The dielectric layer is divided into a plurality of different zones, illustrated in terms of three zones 406a, 406b, and 406c, each having a different thickness. A reflective metal layer 408 is divided into a plurality of electrically isolated zones shown as 408a, 408b and 408c. Overlying the reflective metal layer is an electrooptic medium 410 in the form of a Y type L-B assembly organic polymeric layer satisfying the requirements of the invention as described above. Overlying the electrooptic medium is a counter electrode divided into a plurality of electrically isolated zones shown as counter electrode zones 412, 414 and 416.

Figure 5:
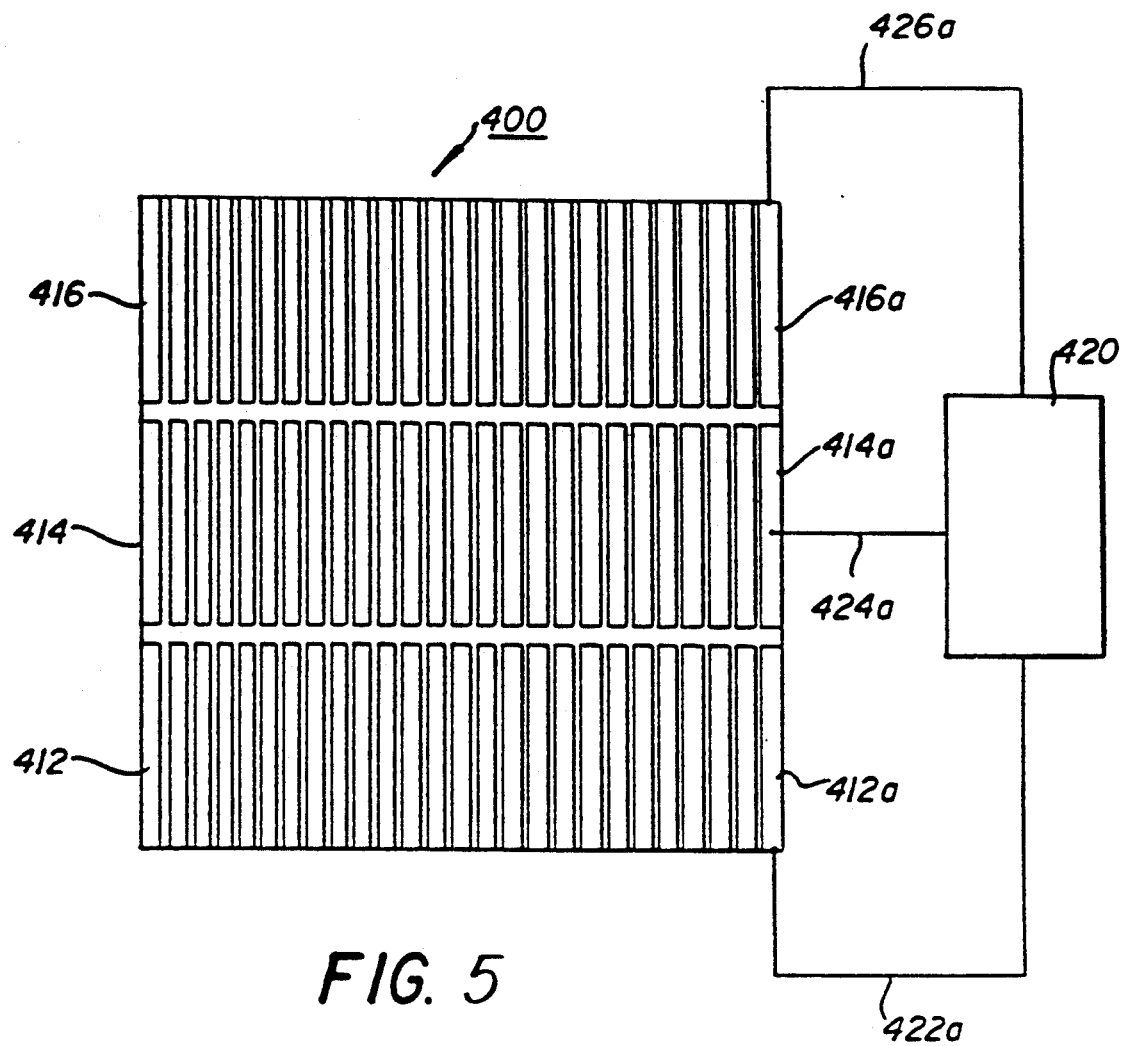
FIG. 5 is a plan view of the optical article of FIG. 4.

Referring to FIG. 5, it can be seen that in a preferred form of the invention each counter electrode zone is in turn divided into a plurality of segments. Segments 412a, 414a and 416a are each representative of the segments within the corresponding zone. In FIG. 5 the representative segments 412a, 414a and 416a are electrically attached through electrical conduction paths 422a, 424a and 426a to a controller 420.

Figure 6:
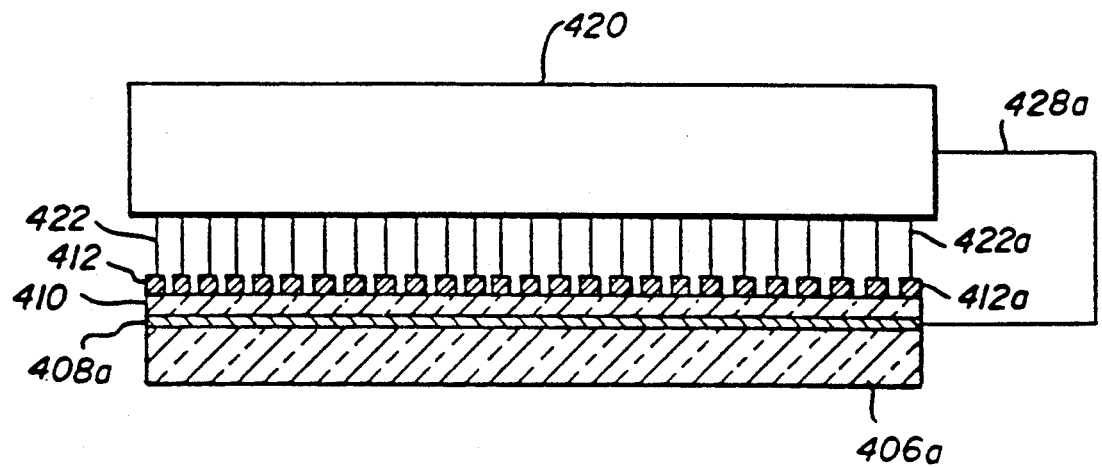
FIG. 6 is a sectional view of the optical article of FIG. 4.

Identical electrical conduction paths are provided between the imaging controller and each of the segments in each zone. This is shown in FIG. 6, which shows all of the electrical connections between the imaging controller and one of the zones of the modulator. The zone 408a of the reflective metal layer is connected to the imaging controller 420 through electrical conduction path 428a. Each segment of the counter electrode zone 412 is connected to the imaging controller through a separate electrical conduction path 422. The electrical conduction path 422a to the segment 412a is representative. Each of the two remaining zones have identical electrical connections to the imaging controller.

Within each zone, by selectively controlling the potential difference between the metal reflective layer and each of the individual segments of the counter electrode it is possible to bias the modulator so that in selected segment areas the modulator exhibits maximum reflection of polarized monochromatic electromagnetic radiation directed toward it and in other selected segment areas the modulator exhibits minimum reflection of that same radiation. By using just maximum and minimum reflection biasing it is possible to produce half tone images. It is also possible to modulate reflection intensity over the full range from maximum to minimum reflection to produce continuous tone images. By independently addressing two or more of the zones concurrently it is possible to produce multicolor images.

Use can be illustrated by considering the exposure of a photographic element 500, comprised of a support 501 and three superimposed image recording portions 503a, 503b and 503c, each capable of recording electromagnetic radiation of a different wavelength, coated on the support, by reflections from the modulator in areas controlled by representative counter electrode segments 412a, 414a and 416a. As shown in FIG. 4 the modulator is addressed by a beam of polarized monochromatic electromagnetic radiation indicated by arrow 505a directed at a point of incidence 507a with the dielectric layer in zone 406a in an area of the modulator underlying representative counter electrode segment 412a. The beam forms an angle of incidence $\theta$ measured from an axis normal to the dielectric layer. The potential biasing supplied by the controller 420 to the zone 408a of the reflective metal layer through conduction path 428a and the counter electrode segment 412a through conduction path 422a is as shown intermediate between that required for either maximum or minimum reflection. A portion of the incident electromagnetic radiation is propagated within the modulator along the interfaces of the reflective metal layer as a long range surface plasmon or in the electrooptic medium as a guided mode. This occurs because the potential gradient applied by the counter electrode segment 412a has resulted in locally adjusting the refractive index of the electrooptic medium 410 to a level that permits coupling of the wavefronts at the opposite interfaces of the reflective metal layer.

When the potential difference is adjusted for optimum internal propagation, very little, if any, of the incident beam is reflected from the device. When the potential difference is adjusted to prevent internal propagation, the incident beam is specularly reflected from the device with no significant spreading.

With intermediate biasing, as shown, the reflected beam 509a is slightly spread in the direction of propagation within the device, since evanescent fractions of the electromagnetic radiation can emerge from the device at displacements of up to 100 mm from the point of incidence. However, the intensity of the reflected beam falls off sharply with its displacement from the point of incidence. No significant spreading of the incident beam normal to the longitudinal axis of the segment 412a occurs, since the beam lacks lateral propagation momentum. Hence, no significant lateral spreading of electromagnetic radiation between counter electrode segment areas occurs. In a similar manner polarized monochromatic beams 505b and 505c are directed to zones 406b and 406c of the dielectric layer at points of incidence 507b and 507c, respectively, resulting in 509b and 509c.

Each of the three beams 505a, 505b and 505c supplies polarized monochromatic electromagnetic radiation of a different wavelength. To allow the modulator to couple internally or reflect simultaneously and selectively beams of each of three different wavelengths it is necessary that the dielectric layer have three different thicknesses, a different thickness in each zone. The thicknesses of the dielectric layer in the three different zones are proportional to the relative wavelengths of the electromagnetic radiation. As shown, the zones distinguished by a, b and c reference numeral suffixes, referred to hereafter as the a, b and c zones, are constructed to allow electromagnetic radiation of the longest wavelength to be modulated by the a zone, intermediate wavelength to be modulated by the b zone, and the shortest wavelength to be modulated by the c zone. The zones can be identical, except for the thickness of the dielectric layer. If, for example, beams 505a, 505b and 505c represent wavelengths of 300 nm, 800 nm and 1300 nm, respectively, the ratios of the thicknesses of the dielectric layer in the a, b and c zones are

1300:800:300 or 4.3:2.7:1

Differing wavelengths for the three separate beams can be selected ranging from the near ultraviolet, typically including wavelengths as short as about 300 nm, through the visible region of the spectrum, and through the near infrared portion of the electromagnetic spectrum, typically through about 1.5 mm. Monochromatic sources of electromagnetic radiation can be provided by filtration, lasers or any other convenient conventional source.

To expose the photographic element 500 in a single area to all three of the beams 509a, 509b and 509c an integrating lens 515 is provided, which provides a combined beam 517.

While differing approaches for sequentially exposing different areas of the photographic element are possible, in the simplest and preferred scanning approach the beams 505a, 505b, and 505c are each laterally expanded lines that concurrently impinge on all of the segment areas within the a, b and c zones, respectively, of the modulator, but over only a narrow portion of each segment area. In this instance the integrating lens 515 is a hemicylindrical lens that transfers the integrated beam 517, representing a multicolor line exposure, to the mirror 600 and the photographic element 500 in one step. Between each successive laterally displaced line exposure of the photographic element, the biasing of the segments of the counter electrode in each zone are adjusted to permit selective internal propagation or reflection as required for imaging and the mirror 600 is reoriented. This approach offers the advantage that the input beams, modulator, lens and photographic element all remain in a fixed relative spatial relationship during imaging and the mirror alone requires physical manipulation.

In the preferred embodiment of the invention described above the counter electrode is segmented in each zone to permit line-by-line exposure of the photographic element. Instead of segmenting the counter electrode in each zone, it is possible to achieve exactly the same operation by providing instead a segmented reflective metal layer in each zone.

In still another variation neither the counter electrode zones nor the reflective metal layer zones are segmented. In this instance the modulator is intended to address a single point on the multicolor photographic element in a single exposure step. The integrating lens 515 in this instance focuses the beam 517 at a single point or spot on the photographic element. Mirror manipulation can move the location of the exposure spots on the surface of the photographic element to allow an image to be formed in the photographic element.

The multicolor photographic element 500 is chosen to be capable of separately recording each of the three monochromatic sources of electromagnetic radiation being received. As shown, three superimposed image recording layer portions 503a, 503b and 503c are provided. The image recording layer portions are each chosen to be responsive to a different one of the three wavelengths of electromagnetic radiation and to produce a dye image. In multicolor photography the customary practice is to employ three image recording layer portions capable of producing yellow, magenta and cyan dye images, directly or during subsequent processing. The wavelength of the electromagnetic radiation chosen for producing a dye image in any one of the recording layer portions can be selected independently of the hue of the dye image sought to be formed.

The angle at which each of the beams 505a, 505b and 505c strikes the dielectric layer 406 determines whether the modulator internally propagates the beam by generating long range surface plasmons or internally guided modes. At the highest angle of incidence $\theta$ that produces internal propagation internal long range surface plasmon propagation occurs. At lower values of $\theta$ internal guided mode propagation occurs. A choice of angles are available for achieving guided mode operation. Generally best results are achieved at the first (zero order) guided mode angle first encountered following the long range surface plasmon producing angle. Appropriate angles of incidence of the polarized monochromatic electromagnetic radiation can be calculated from known physical relationships. Optimum angles can also be readily determined simply by varying the angles of incidence and observing the optimum angles for modulation.

Although the prism 402 is shown as the support for the modulator, it is appreciated that the optical articles of this invention can be formed on any convenient conventional optical coupling element. For example, the prism can be replaced with an optical grating.

A device similar to Device D, but lacking the Y type L-B assembly construction of the invention to form the electrooptic medium, is disclosed in Schildkraut et al U.S. Ser. No. 583,620, filed Sep. 17, 1990, commonly assigned, titled OPTICAL ARTICLE FOR MULTICOLOR IMAGING.

Device E

Article with Optically Active Stripe(s)

In the foregoing constructions the Y type L-B assembly forming the organic layer unit is coextensive with the support on which it is formed. It is specifically contemplated to construct optical articles comprised of high second order polarization susceptibility organic layer units that are restricted to selected portions of a support.

As a specific example, an optical article according to the invention can be constructed according to the teachings of Yoon et al U.S. Pat. No. 4,936,645, the disclosure of which is here incorporated by reference, but with the modification that a Y type L-B assembly according to the invention is substituted for the spin-coated high second order polarization susceptibility polymeric layer employed by Yoon et al. A specific construction shown by Yoon et al is a Mach-Zehnder interferometer, but the teachings of Yoon et al are generally applicable to the construction of varied high second order polarization susceptibility optical articles in which an optically active polymeric layer is restricted to a selected portion of a substrate.

The following is illustrative of a procedure for restricting an optically active Y type L-B layer unit to a selected portion of a support:

An exemplary starting element can take the following form:

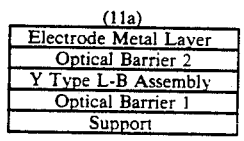

where

Support represents any convenient conventional support.

Y Type L-B Assembly represents any of the various Y type L-B assemblies described above as providing the combination of high second order polarization susceptibility and low optical attenuation.

Optical Barrier 1 and 2 are essentially transparent layers that are chosen to exhibit a lower refractive index that the Y Type L-B Assembly to avoid optical losses in the latter. When the support is capable of satisfying all the requirements placed on Optical Barrier 1, the latter can, of course, be omitted. Although the optical barriers can be either electrically conductive or insulative, depending upon the specific type of optically active device to be constructed, in one specifically preferred form Optical Barrier 1 is constructed of a transparent conductive layer, such as indium tin oxide, so that it is capable of forming a device electrode.

To pattern the layers on the support, a photoresist pattern is created as follows:

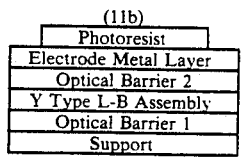

Chemical etching is next performed to remove the portion of the Electrode Metal Layer that is not protected by the Photoresist, thereby creating the final Electrode configuration, as shown below:

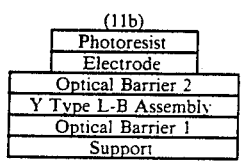

The next step of the process is to pattern the Y Type L-B Assembly and Optical Barriers 1 and 2. This can be done by any convenient technique, such as reactive ion etching or ion milling. After this step is completed, the residual photoresist is removed to leave the following completed structure:

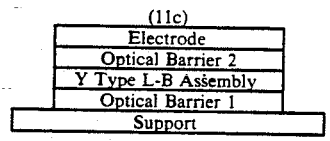

EXAMPLES

The invention can be better appreciated by reference to the following specific Examples. The Examples demonstrate the high second order polarization susceptibilities and low optical attenuations realized by constructing Y type L-B assemblies using polymeric amphiphiles in which the lipophilic moieties L of the repeating units of at least one of the amphiphile polymers exhibits a branched structure of up to 9 carbon atoms—e.g., satisfying structure (9) above. The Examples further demonstrate the feasibility and advantages of constructions incorporating Y type L-B assemblies and the inferiority of X and Z type L-B assemblies. In each of the Examples, preparations of Langmuir-Blodgett layer units were carried out using a commercial Langmuir two compartment trough mechanically equipped to transfer the substrate from one trough to the other, either while submerged in water contained in the reservoir or while held above the liquid reservoir. This permitted deposition on the substrate of different materials in each the two compartments in sequence permitting the film in each compartment to provide multiple layers on the substrate as the operation was repeated.

EXAMPLE 1

The purpose of this example is to demonstrate the preparation of a Y type Langmuir-Blodgett assembly having the layer sequence shown in diagram (8a) above and having a lipophilic moiety L in one of the polymer amphiphiles satisfying the branched requirement of structure (9) above. This example demonstrates light propagation and low optical attenuation in the L-B film.

In one compartment a polymeric amphiphile PM-2 (hereinafter in this example referred to as Film A) was dissolved in chloroform, spread on the surface of a pool of pure water and compressed. The amphiphile PM-2 contained H—D—E—A—L repeating units, with adjacent repeating units being joined through the hydrophilic moiety H. In the other compartment polymeric amphiphile PS-2 (hereinafter in this example referred to as Film B) was dissolved in chloroform, spread on the surface of a pool of pure water and compressed. The polymeric amphiphile PS-2 contained H—S—L repeating units, with adjacent repeating units being joined through the hydrophilic moiety H.

Alternate deposition of Pm-2 and PS-2 layers onto a Pyrex TM glass substrate made hydrophobic by reaction with octadecyl trichlorosilane was performed in a Film B before Film A (B/A) fashion until a total of 131 B/A bilayers were deposited. Based on ellipsometric measurements of Films A and B individually measured on a reflecting substrate, the 131 B/A bilayer film was calculated to be 0.55 μm thick.

The film was visually transparent (clear) and was tested for ability to guide light. Polarized light from a helium-neon laser at 633 nm was coupled into he film through a prism by mechanical contact of the prism with the surface of the film supported on the glass substrate. The film was able to guide light, with a propagation streak being visible the entire length of the sample (>3 cm). The intensity of the light beam in the film was measured by microdensitometry of a photographic image of the propagation streak. Attenuation of the waveguided light beam in the film was determined by this analysis to be approximately 1 dB/cm of the film length, indicating an extremely low level of optical attentuation in the film as compared to previously reported optical attenuations in high second order polarization susceptibility films.

EXAMPLE 2 (control)

The purpose of this example is to demonstrate the importance of the branched lipophilic moiety L in achieving the low optical attentuation levels reported in Example 1.

Alternate deposition of PM-2 (hereinafter in this example referred to as Film A) and 22-triscosenoic acid (hereinafter in this example referred to as Film B) onto a Pyrex TM glass substrate identical to that of Example 1 was performed in a Film B before Film A (B/A) fashion until a total 88 B/A bilayers were deposited. Based on ellipsometric measurements of films A and B individually measured on a reflecting substrate, this film was calculated to be 0.58 μm thick.

Although at the measured thickness the film theoretically should have been capable of guiding light at 633 nm on the substrate, the film was observed to be only translucent and not transparent—i.e., the film was hazy in appearance. Attempts to couple polarized light from a helium-neon laser at 633 nm into the film through a prism associated with the film as in Example 1 were unsuccessful. Attenuation of light in the film was estimated based on these observations to be greater than 10 dB/cm.

EXAMPLE 3

This example has as its purpose to demonstrate realization of the advantages of the invention in thick L-B film constructions with variances in the substrate and the choice of polymeric amphiphiles.

Alternate deposition of PM-2 (hereinafter in this example referred to as Film A) and PS-1 (hereinafter in this example referred to as Film B) onto a soda glass substrate coated with 1500-2000 Å of indium tin oxide made hydrophobic by a precoat of one L-B layer of PS-1 was performed in a Film B before Film A (B/A) fashion until a total of 124 B/A bilayers were deposited. The layer sequence was completed by six B layers, demonstrating the self-adherency of PS-1. Based on ellipsometric measurements of Films A and B individually measured on a reflecting substrate, this was calculated to be 0.55 μm thick. The film was visually transparent (clear), with internal optical attenuation being estimated to be similar to that of the film of Example 1.

EXAMPLE 4

The purpose of this example is to demonstrate the high second order polarization susceptibility, $\chi^{(2)}$, for a structure corresponding to that of 8(a) above.

Alternate deposition of PM-2 (hereinafter Film B) and PS-2 (hereinafter Film A) onto a silicon substrate made hydrophobic by reaction with octadecyl trichlorosilane was performed in a Film B before Film A (B/A) fashion until a total of 22 B/A bilayers were deposited.

Second order polarization susceptibility was characterized by second harmonic generation (SHG) in a reflection mode using a 1064 nm input polarized electromagnetic input and measuring output intensity at 532 nm. The p-polarized component of the output beam was measured for both p and s-polarized input beams. The ratio of the p-polarized SHG output for p and s-polarized was found by measurement to be 30. This ratio provide a measure of the polar orientation factor of the organic molecular dipole D—E—A of PM-2 that is proportional to the second order polarization susceptibility, $\chi^{(2)}$. $\chi^{(2)}$ was calculated using the polar ratio 30 together with the volume density of the organic molecular dipole, N, the molecular first hyperpolarizability, $\beta$, and the refractive indices of the L-B film at the fundamental and second harmonic wavelengths. N was determined to be $6.8 \times 10^{20}$ cm$^{-3}$ from the molecular cross-section of the PM-2 film at its air-water interface (35 Å$^2$) together with the ellipsometrically measured film thickness (42 Å per bilayer). A published value for $\beta$ of $6.4 \times 10^{-29}$ esu measured at 1900 nm was used, and the refractive indices at 1900 nm and 950 nm was estimated from a value of 1.50 measured at 633 nm by elippsometry. Using these values $\chi^{(2)}$ was calculated to be $1.1 \times 10^{-7}$ esu at 950 nm—i.e., greater than two orders of magnitude above the high second order polarization susceptibility threshold.

EXAMPLE 6

The purpose of this example is to demonstrate the capability of successful successive formation of Langmuir-Blodgett layer units 121 and 123. This example further demonstrates the successful deposition of the spacer amphiphile on itself to create the orientation inversion necessary to the formation of a second L-B layer unit 123. Finally, this example demonstrates the successful formation of an oppositely oriented second Y type Langmuir-Blodgett assembly on the first Y-type Langmuir-Blodgett assembly.

In one compartment a polymeric amphiphile PM-2 (hereinafter referred to as Film A) was dissolved in chloroform, spread on the surface of a pool of pure water and compressed. The amphiphile PM-2 can be schematically represented as Hy—D—E—A—L, where polymerization was through the Hy moiety.

In the other compartment polymeric amphiphile PS-1 (hereinafter also referred to as Film B) was dissolved in chloroform, spread on the surface of a pool of pure water and compressed. The polymeric amphiphile PS-1 can be schematically represented as Hy-S-L, where polymerization was through the Hy moiety.

Alternate deposition of PM-2 and PS-1 onto a silicon substrate made hydrophobic by reaction with octadecyl trichlorosilane by standard procedures was performed in a Film B before Film A (B/A) sequence fashion until several B/A bilayers were deposited. An even number (six) of B layers were deposited on top of the B/A bilayers. Alternate deposition was resumed depositing bilayers in an A/B fashion. A total of eighteen layers were deposited, with six of the eighteen being PM-2 l layers.

Film thickness characterization was measured by elippsometry (thickness variability) and second order nonlinear optical activity by Second harmonic Generation (SHG) in reflection mode using a 1064 nm input wavelength and measuring output intensity at 532 nm using an optical system similar to that reported frequently in the literature. Sample thickness varied less than 5% across this film and was (291Å) which is within 10% of expected thickness based on the ellipsometric measurement of films of A and B individually. Film characterization by SHG showed a low signal. The electronically amplified detector signal was +0.6 volts relative to the uncoated substrate. The low SHG measurement confirmed that the B/A bilayers and the A/B bilayers together formed a centrosymmetric unit. This in turn confirmed that the orientation inversion of the molecular dipoles required for a second L-B layer unit had been successfully achieved.

EXAMPLE 7

The purpose of this example is to demonstrate the preparation of a Y type Langmuir-Blodgett film assembly having a layer structure as in Example 1 but with a polymeric amphiphile containing a chromophore with a high second order polarizability which is transparent to electromagnetic radiation in the blue region of the spectrum between 400 and 500 nanometers. This example demonstrates light propagation and low optical attenuation in the L-B film in the blue region of the spectrum.

Alternate deposition was performed in the manner described in Example 1, using PM-6 as film A and PS-2 as film B. The substrate used was Pyrex ™ glass which had been made hydrophobic by reaction with octadecyltrichlorosilane in the manner described in Example 1.

A total of 336 layers were deposited in a film B before A fashion (B/A). Ellipsometry measured a total film thickness of 0.93 microns.

The film was visually transparent (clear) and was tested for ability to guide light in the same manner as in Example 1, except that the light used was from an argon-ion laser at 457.9 nanometers polarized to propagate in the transverse magnetic mode. Optical attenuation of approximately 1.4 decibels per centimeter of film length was observed indicating a very low level of optical attenuation.

The invention has been described in detail with particular reference to preferred embodiments thereof, but it will be understood that variations and modifications can be effected within the spirit and scope of the invention.

What is claimed is:

1. An optical article comprised of
an organic layer unit exhibiting a second order polarization susceptibility greater than $10^{-9}$ esu, and
means for providing an optical input to and an optical output from the layer unit,
wherein said organic layer unit exhibits a transmission attenuation of less than 2 dB/cm and is comprised of a Y type Langmuir-Blodgett assembly having superimposed oriented monomolecular layers of first polymeric amphiphiles and interposed between each adjacent pair of oriented monomolecular layers of said first polymeric amphiphiles, an oriented monomolecular layer of second polymeric amphiphiles,
said first polymeric amphiphiles each containing repeating units exhibiting the structure:

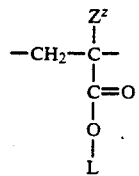

said second polymer amphiphiles each containing repeating units exhibiting the structure:

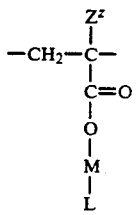

wherein
$Z^z$ represents hydrogen, methyl, ethyl or cyano;
M is an organic molecular dipole linking group comprised of —A—E—D—;
wherein A is an electron acceptor;
D is an electron donor;
E is a conjugated $\pi$ bonding system linking A and D; and
L represents a lipophilic moiety;
wherein L in at least one of the first and second amphiphiles is a branched lipophilic moiety of up to 9 carbon atoms exhibiting the structure

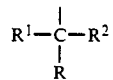

wherein
R is hydrogen or a hydrocarbon and
$R^1$ and $R^2$ represent separate hydrocarbons or together complete a cyclic hydrocarbon.

2. The optical article of claim 1 wherein said first and second polymeric amphiphiles are products of polymerization antecedent to Langmuir-Blodgett deposition.

3. The optical article of claim 2 wherein said organic layer unit exhibits a transmission attenuation of less than 2 dB/cm for electromagnetic radiation having a wavelength between 400 and 500 nanometers.

4. An optical article according to claim 1 further wherein the branched lipophilic moiety is a tertiary or iso-alkyl moiety.

5. The optical article of claim 1 wherein said L groups of said first or second layers are selected from the group consisting of 2-propyl, 2-butyl, 2-(2-methylpropyl), 2-(2-methylbutyl), 2-(2-ethylbutyl), 2-(3-methylbutyl), 2-pentyl, 2-(2-methylpentyl), 2-(3-methylpentyl), 3-pentyl, 3-(2,4-dimethylpentyl), 3-(3-ethylpentyl), 2-hexyl, 2-(2-methylhexyl), 2-(3-methylhexyl), 2-(4-methylhexyl), 2-(3-ethylhexyl), 2-(4-ethylhexyl), 2-heptyl, 4-heptyl, 4-(3-ethylheptyl), cyclopentyl, cyclohexyl, phenyl, tolyl, xylyl, ethylphenyl, and norboranyl.

6. The optical article of claim 1 wherein H represents a moiety selected from the group consisting of

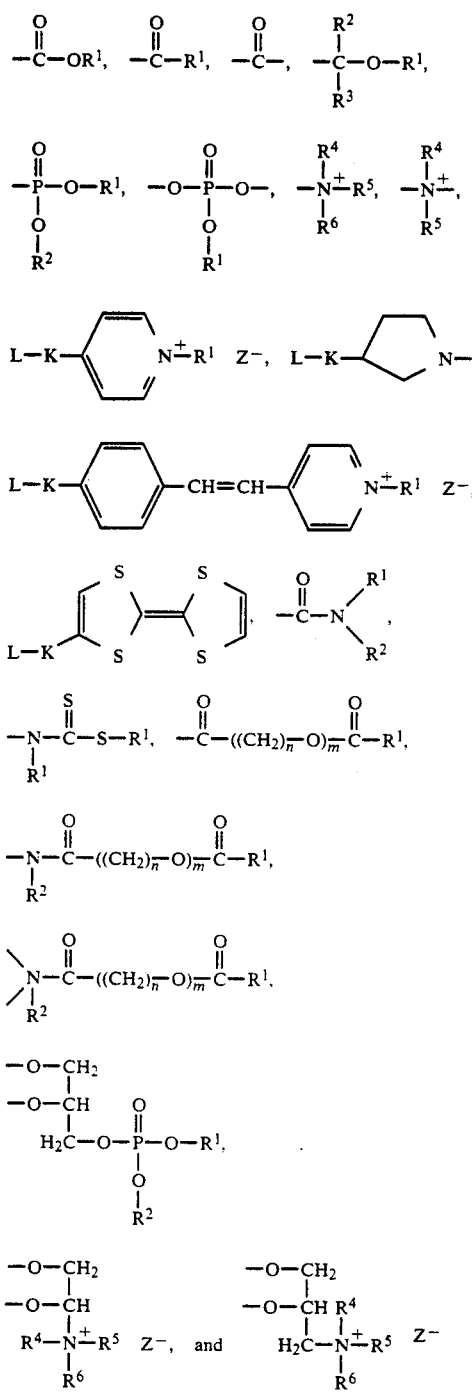

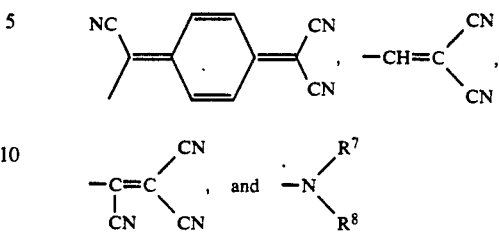

wherein
m is an integer of from 1 to 20,
n is an integer of from 1 to 6,
$R^1$, $R^2$ and $R^3$ are independently hydrogen or hydrocarbon or substituted hydrocarbon,
$R^4$, $R^5$ and $R^6$ independently represent any of the same hydrocarbon or substituted hydrocarbon groups as $R^1$ and $R^2$ or any two together represent carbon and option oxygen atoms completing a 4 to 7 member ring and
Z represents a counter ion;
with the proviso that bivalent H groups are covalently bonded to a pair of said molecular dipoles; or H and A together represent a moiety selected from the group consisting of $-NO_2$, $-CN$, $-SO_2-CH_3$,

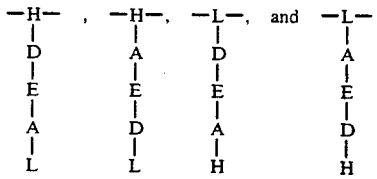

wherein
$R^7$ and $R^8$ are independently hydrogen, hydrocarbon or substituted hydrocarbon.

7. An optical article according to claim 1 further wherein the second amphiphile is selected from the group consisting of poly{4'-N-methyl-N-[2-(2-acryloyloxethoxy)ethoxy]ethylamino-4-octadecylsulfonyl azobenzene};
poly{4'-N-methyl-N-[2-(2-acryloyloxethoxy)ethoxy]ethylamino-4-octadecylsulfonyl azobenzene-co-2-hydroxyethyl acrylate};
poly{4'-dioctadecylamino-4-(6-acryloyloxy)hexylsulfonyl azobenzene-co-2-hydroxyethyl acrylate}; and
poly{4'-N-methyl-N-(8-acryloyloxy)octylamino-4-octadecylsulfonyl azobenzene-co-N,N-dimethylacrylamide).

8. An optical article comprising
an organic layer unit exhibiting a second order polarization susceptibility greater than $10^{-9}$ esu, and
means for providing an optical input to and an optical output from said layer unit,
said organic layer unit exhibiting a transmission attenuation of less than 2 dB/cm and being comprised of a Y type Langmuir-Blodgett assembly having superimposed, oriented monomolecular layers, said layers including first and second layers disposed in alternation,
said first layers containing a first polymeric amphiphile having repeating units having general structures selected from the group consisting of

```
—H—  , —H—,  —L—,  and  —L—
 |      |     |          |
 D      A     D          A
 |      |     |          |
 E      E     E          E
 |      |     |          |
 A      D     A          D
 |      |     |          |
 L      L     H          H
``` said second layers containing a second polymeric amphiphile having repeating units having general structures selected from the group consisting of

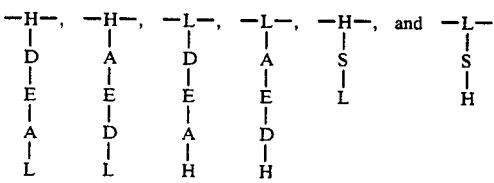

wherein for said repeating unit structures

H is a hydrophilic moiety, with the proviso that H in combination with A or D may represent a single moiety;

L is a lipophilic moiety, and L in at least one of said first and second polymeric amphiphiles is a branched lipophilic moiety exhibiting the structure

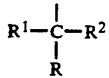

wherein
R is hydrogen or a hydrocarbon and
$R^1$ and $R^2$ represent separate hydrocarbons or together complete a cyclic hydrocarbon,
with the proviso that if the L has covalent bonds to two other L groups and L is a branched moiety, then L is styryl;
S is a linking group having a second order polarizability of less than $10^{-30}$ esu; and
said —D—E—A— and —A—E—D— moieties define molecular dipoles wherein A is an electron acceptor, D is an electron donor, and E is a conjugated $\pi$ bonding system linking A and D;
with the proviso that molecular dipoles in said first and second layers have the same orientation.

9. The optical article of claim 8 wherein said first and second polymeric amphiphiles are products of polymerization antecedent to Langmuir-Blodgett deposition.

10. The optical article of claim 9 wherein said organic layer unit exhibits a transmission attenuation of less than 2 dB/cm for electromagnetic radiation having a wavelength between 400 and 500 nanometers.

11. The optical article of claim 8 wherein said branched L moieties are tertiary alkyl or isoalkyl.

12. The optical article of claim 8 wherein said L groups of said first or second layers are selected from the group consisting of 2-propyl, 2-butyl, 2-(2-methylpropyl), 2-(2-methylbutyl), 2-(2-ethylbutyl), 2-(3-methylbutyl), 2-pentyl, 2-(2-methylpentyl), 2-(3-methylpentyl), 3-pentyl, 3-(2,4-dimethylpentyl), 3-(3-ethylpentyl), 2-hexyl, 2-(2-methylhexyl), 2-(3-methylhexyl), 2-(4-methylhexyl), 2-(3-ethylhexyl), 2-(4-ethylhexyl), 2-heptyl, 4-heptyl, 4-(3-ethylheptyl), cyclopentyl, cyclohexyl, phenyl, tolyl, xylyl, ethylphenyl, and norboranyl.

13. The optical article of claim 8 wherein H represents a moiety selected from the group consisting of

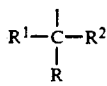

wherein
m is an integer of from 1 to 20,
n is an integer of from 1 to 6,
$R^1$, $R^2$ and $R^3$ are independently hydrogen or hydrocarbon or substituted hydrocarbon.
$R^4$, $R^5$ and $R^6$ independently represent any of the same hydrocarbon or substituted hydrocarbon groups as $R^1$ and $R^2$ or any two together represent carbon and option oxygen atoms completing a 4 to 7 member ring and
Z represents a counter ion;

with the proviso that bivalent H groups are covalently bonded to a pair of said molecular dipoles; or H and A together represents a moiety selected from the group consisting of $-NO_2$, $-CN$, $-SO_2-CH_3$,

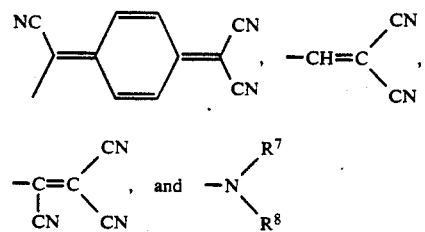

wherein
$R^7$ and $R^8$ are independently hydrogen, hydrocarbon or substituted hydrocarbon.

14. The optical article of claim 8 wherein S is selected from the group consisting of
$-(CH_2)_n-$, wherein n is an integer from 1 to 24;
$-(CH_2)_n-Z-$, wherein n is an integer from 1 to 24 and Z is O, S, or $-N(R^1)-$ and $R^1$ is hydrocarbon;
$-(CH_2)_i-(CH=CH)_m-(CH_n)-$, wherein i, m and n are each integers from 4 to 20;
$-(CH_2)_m-C\equiv C-C\equiv C-(CH_2)_n-$, wherein m and n are each integers from 4 to 20;

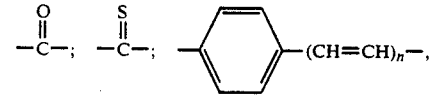

wherein n is an integer from 1 to 10;

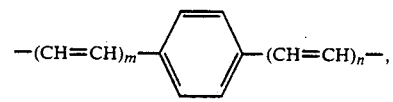

wherein m and n are each integers from 1 to 10;

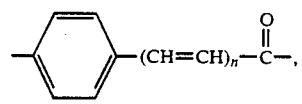

wherein n is an integer from 1 to 10;

wherein m and n are each integers from 1 to 10;

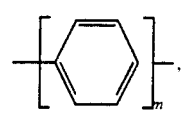

wherein m is an integer from 1 to 5;

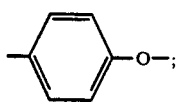

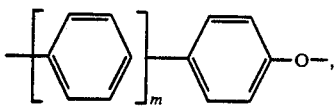

wherein m is an integer from 1 to 5;
and E is selected from the group consisting of
wherein G is independently in each occurrence methine or substituted methine, aza, or —CR$^{11}$—, wherein R$^{11}$ is hydrogen or alkyl from 1 to 3 carbons, n is from 1 to 3, with the proviso that no more than two aza moieties are next adjacent;

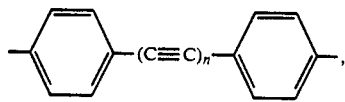

wherein n is from 1 to 3;

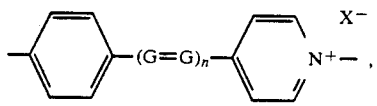

wherein G is independently in each occurrence methine or substituted methine, aza, or —CR$^{11}$—, wherein R$^{11}$ is hydrogen or alkyl from 1 to 3 carbons, n is from 1 to 3, with the proviso that no more than two aza moieties are next adjacent,
and X$^-$ is a counter ion; and

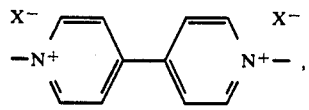

15. The optical article of claim 8 wherein said molecular dipoles are selected from the group consisting of 4-(N-methyl-N-octadecylamino)-4'-nitrostilbene;
4-(N,N-dioctadecylamino)-4'-methylsulfonylstilbene;
4-{2-[4-(N,N-dimethylamino)phenyl]ethenyl}-N-octadecylpyridinium chloride;
4-{2-[4-(N,N-dimethylamino)phenyl]ethenyl}-N-docosanylpyridinium sulfate;
6-{N-methyl-N-[4-(4'-octadecylsulfonyl)stilbene]amino}hexanoic acid; and
4-(N-methyl-N-(3,6-dioxyoctan-8-ol)amino-4'-octadecylsulfonylstibene.

16. The optical article of claim 8 wherein said first amphiphile is selected from the group consisting of
poly{4'-N-methyl-N-[2-(2-acryloyloxethoxy)ethoxy]ethylamino-4-octadecylsulfonyl azobenzene};
poly{4'-N-methyl-N-[2-(2-acryloyloxethoxy)ethoxy]ethylamino-4-octadecylsulfonyl azobenzene-co-2-hydroxyethyl acrylate} [1:4-6 mole ratio];
poly{4'-dioctadecylamino-4-(6-acryloyloxy)hexylsulfonyl azobenzene-co-2-hydroxyethyl acrylate} [1:4-6 mole ratio];
poly{4'-N-methyl-N-(8-acryloyloxy)octylamino-4-octadecylsulfonyl azobenzene-co-N,N-dimethyl acrylamide} [1:4-6 mole ratio];
poly{N-[2-(hexamethyleneiminocarbonyloxy)ethyl]-N-[2¹-(iminocarbonyloxy)ethyl]-N-[4-(4'-octadecylsulfonyl-azobenzene]amine}; and
poly{1-N-methyl-N-[6-(acryloyloxy)hexylamino-4-perfluorodecylsulfonylphenyl]-co-2-hydroxyethyl acrylate} {1 to 1.2 mole ration}.

17. The optical article of lcaim 8 wherein one of the first and second amphihiles is poly{1-N-methyl-N-(6-{acryloyloxy}hexylamino-4-perfluorodecylsulfonylphenyl-co-2-hydroxyethyl acrylate.

* * * * *